US010081699B2

(12) United States Patent
Sato et al.

(10) Patent No.: US 10,081,699 B2
(45) Date of Patent: Sep. 25, 2018

(54) RUBBER COMPOSITION FOR TIRE TREAD, AND PNEUMATIC TIRE

(71) Applicant: The Yokohama Rubber Co., LTD., Minato-ku, Tokyo (JP)

(72) Inventors: Masaki Sato, Hiratsuka (JP); Satoshi Mihara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 313 days.

(21) Appl. No.: 14/770,457

(22) PCT Filed: Feb. 25, 2014

(86) PCT No.: PCT/JP2014/054589
§ 371 (c)(1),
(2) Date: Aug. 25, 2015

(87) PCT Pub. No.: WO2014/129665
PCT Pub. Date: Aug. 28, 2014

(65) Prior Publication Data
US 2016/0009846 A1     Jan. 14, 2016

(30) Foreign Application Priority Data

Feb. 25, 2013 (JP) .................. 2013-035027
Feb. 25, 2013 (JP) .................. 2013-035030

(51) Int. Cl.
| | |
|---|---|
| C08F 297/04 | (2006.01) |
| C08F 236/08 | (2006.01) |
| C08C 19/20 | (2006.01) |
| B60C 1/00 | (2006.01) |
| C08L 15/00 | (2006.01) |
| C08L 83/08 | (2006.01) |
| C08L 9/06 | (2006.01) |
| C08F 299/02 | (2006.01) |
| C08C 19/25 | (2006.01) |
| C08K 5/548 | (2006.01) |
| C08G 77/14 | (2006.01) |
| C08G 77/392 | (2006.01) |

(52) U.S. Cl.
CPC ............ *C08F 297/04* (2013.01); *B60C 1/00* (2013.01); *B60C 1/0016* (2013.01); *C08C 19/25* (2013.01); *C08F 299/02* (2013.01); *C08L 9/06* (2013.01); *C08L 15/00* (2013.01); *C08L 83/08* (2013.01); *C08C 19/20* (2013.01); *C08G 77/14* (2013.01); *C08G 77/392* (2013.01); *C08K 5/548* (2013.01); *Y02T 10/862* (2013.01)

(58) Field of Classification Search
CPC .... C08F 299/02; C08F 293/00; C08F 297/04; C08F 297/044; C08F 297/046; C08F 236/04; C08F 236/06; C08F 236/08; C08F 236/10; C08C 19/20; C08C 19/24; C08K 5/372; C08K 5/548; C08K 5/5415; C08L 9/00; C08L 9/06; C08L 15/00
See application file for complete search history.

(56) References Cited

U.S. PATENT DOCUMENTS

| | | |
|---|---|---|
| 6,331,605 B1 | 12/2001 | Lunginsland et al. |
| 6,608,145 B1 | 8/2003 | Lin et al. |
| 2003/0088034 A1 | 5/2003 | Luginsland et al. |
| 2003/0109614 A1 | 6/2003 | Luginsland et al. |
| 2006/0217473 A1 | 9/2006 | Hergenrother et al. |
| 2009/0215948 A1 | 8/2009 | Guy et al. |
| 2011/0301280 A1 | 12/2011 | Kushida |
| 2014/0005431 A1 | 1/2014 | Hirokami et al. |
| 2014/0213708 A1 | 7/2014 | Kushida |

FOREIGN PATENT DOCUMENTS

| | | |
|---|---|---|
| EP | 2540747 | 1/2013 |
| FR | 2886308 | 12/2006 |
| JP | H10-273559 | 10/1998 |
| JP | 2000-038395 | 2/2000 |
| JP | 2001-192454 | 7/2001 |
| JP | 2003-113243 | 4/2003 |
| JP | 2004-511598 | 4/2004 |
| JP | 2008-537740 | 9/2008 |

(Continued)

OTHER PUBLICATIONS

WO 2004/056918 A1, machine translation, 2004.*
JP 2012-131983, machine translation, 2012.*
JP 2009-209262, abstract only, 2009.*
European Search Report for European Patent Application No. 14754354.0 dated Jul. 29, 2016, 10 pages.
International Search Report for International Application No. PCT/JP2014/054589 dated Jun. 17, 2014, 4 pages, Japan.
Chenchy J. Lin, William L. Hergenrother, Ashley S. Hilton, Reduction of Volatile Organic Compound Emission. II., Use of Alkoxy-Modified Silsesquioxane for Compounding, Silica-Filled Rubbers, Journal of Applied Polymer Science, Aug. 12, 2008, pp. 655-664, vol. 115, Wiley Periodicals, Inc., Akron, Ohio, United States.

*Primary Examiner* — Roberto Rabago
(74) *Attorney, Agent, or Firm* — Thorpe North & Western

(57) ABSTRACT

A rubber composition contains a diene rubber component containing at least 20 mass % of a modified conjugated diene rubber, a silica, and a silane coupling agent; the modified conjugated diene rubber having at least one modified part and at least one conjugated diene rubber part; the conjugated diene rubber part having a conjugated diene copolymer block and an isoprene block containing from 70 mass % to 100 mass % of isoprene units in each conjugated diene rubber part; the modified part bonding to an end of the conjugated diene rubber part and having a functional group which interacts with the silica; a content of the silica being from 60 to 200 parts by mass per 100 parts by mass of the diene rubber component; the silane coupling agent being a polysiloxane represented by formula (1), $(A)_a(B)_b(C)_c(D)_d(R^1)_e SiO_{(4-2a-b-c-d-e)/2}$, and having a content from 1.0 to 20 mass % of the content of the silica.

13 Claims, 1 Drawing Sheet

(56) References Cited

FOREIGN PATENT DOCUMENTS

| | | | |
|---|---|---|---|
| JP | 2010-270247 | | 12/2010 |
| JP | 2011-252124 | | 12/2011 |
| JP | 2012-097257 | | 5/2012 |
| JP | 2012-131983 | * | 7/2012 |
| JP | 2014-028797 | | 2/2014 |
| WO | WO 2002/031034 | | 4/2002 |
| WO | WO 2004/056918 | * | 7/2004 |
| WO | WO2004/056918 | | 7/2004 |
| WO | WO 2006/102518 | | 9/2006 |
| WO | WO 2013/031488 | | 3/2013 |
| WO | WO 2014/002750 | | 1/2014 |
| WO | WO 2014/034673 | | 3/2014 |

* cited by examiner

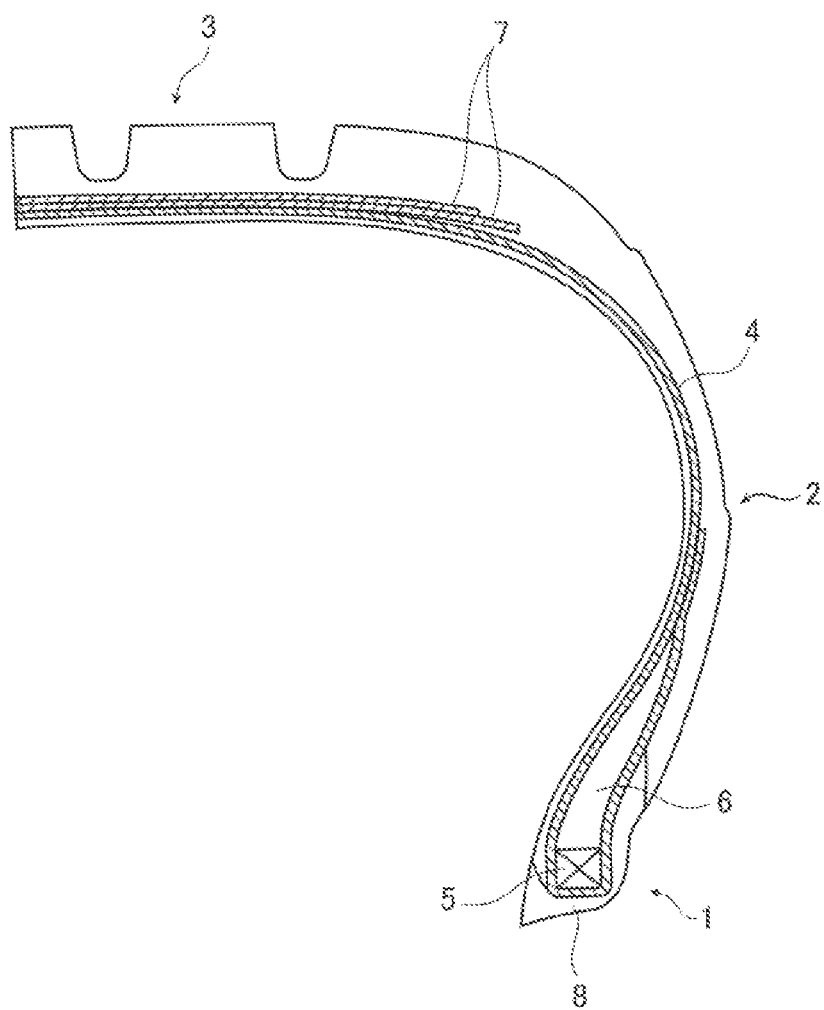

RUBBER COMPOSITION FOR TIRE TREAD, AND PNEUMATIC TIRE

TECHNICAL FIELD

The present technology relates to a rubber composition for a tire tread and a pneumatic tire using the same.

BACKGROUND

In recent years, there has been a demand to reduce tire rolling resistance from the perspective of low fuel consumption at the time of vehicle traveling. In addition, there has been a demand for improvements in wet performance from the perspective of safety. A known method of achieving this is a method of establishing both low rolling resistance and wet performance by adding silica to a rubber component constituting the tread part of a tire.

However, silica has low affinity with rubber components, and the cohesiveness of silica components is high, so even if silica is simply added to the rubber component, the silica is not dispersed, and which leads to the problem that the effect of reducing the rolling resistance or the effect of improving the wet performance cannot be sufficiently achieved.

Under such circumstances, the present applicant proposed a rubber composition containing a modified polymer capable of reacting with silica (Japanese Unexamined Patent Application Publication No. JP2012-131983A) and a rubber composition containing a mercaptosilane capable of reacting with silica (Japanese Unexamined Patent Application Publication No. JP2010-270247A) as techniques for dispersing silica.

In addition, there is also a demand for there to be little crosslinking (rubber burning) in the rubber composition for a tire tread at the storage stage or the stage before the vulcanization process. That is, there is a demand for excellent processability (for example, for the composition to have an appropriate viscosity and excellent scorch resistance and extrudability; same hereafter).

In recent years, environmental issues and resource problems have led to a demand for even lower fuel consumption in vehicles, which in turn has led to a demand for further improvements in the low rolling resistance of tires. In addition, in step with improvements in the required safety level, there has also been a demand for further improvements in wet performance. Due to such reasons, the present inventors assessed that there is room for improvement in the low rolling resistance or wet performance of a conventional rubber composition containing a mercaptosilane that can react with silica.

Under such circumstances, when the present inventors researched rubber compositions containing a conventional conjugated diene rubber and the mercaptosilane used in the rubber composition described in Patent Document 2, it became clear that the low rolling resistance, wet performance, and processability do not satisfy the currently required levels. In addition, when the present inventors researched rubber compositions containing the modified polymer used in the rubber composition described in Patent Document 1 and the mercaptosilane used in the rubber composition described in Patent Document 2, it became clear that the processability does not satisfy the currently required level.

SUMMARY

The present technology provides a rubber composition for a tire tread having excellent wet performance and low rolling resistance when formed into a tire as well as excellent processability.

A rubber composition for a tire tread having excellent wet performance and low rolling resistance when formed into a tire and having excellent processability can be obtained by using a rubber composition containing a prescribed amount of a specific modified conjugated diene rubber, a silica, and a polysiloxane represented by the average composition formula of formula (1) described below as a silane coupling agent in combination.

That is, the present technology provides the following rubber composition for a tire tread and a pneumatic tire using the same.

1. A rubber composition for a tire tread containing a diene rubber component containing at least 20 mass % of a modified conjugated diene rubber, a silica, and a silane coupling agent;
the modified conjugated diene rubber having at least one modified part and at least one conjugated diene rubber part;
the conjugated diene rubber part having a conjugated diene copolymer block and an isoprene block containing from 70 mass % to 100 mass % of isoprene units in each conjugated diene rubber part;
the modified part bonding to an end of the conjugated diene rubber part; the modified part having a functional group which interacts with the silica;
the silane coupling agent being a polysiloxane represented by the following formula (1);
a content of the silica being from 60 to 200 parts by mass per 100 parts by mass of the diene rubber component;
and a content of the silane coupling agent being from 1.0 to 20 mass % of the content of the silica.

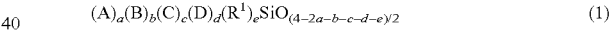
$$(A)_a(B)_b(C)_c(D)_d(R^1)_e SiO_{(4-2a-b-c-d-e)/2} \quad (1)$$

[Formula (1) is an average composition formula, and in formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

2. The rubber composition for a tire tread according to 1 described above, wherein a is greater than 0 in formula (1).
3. The rubber composition for a tire tread according to 1 or 2 described above, wherein b is greater than 0 in formula (1).
4. The rubber composition for a tire tread according to any one of 1 to 3 described above, wherein the skeleton of the modified part is polyorganosiloxane.
5. The rubber composition for a tire tread according to any one of 1 to 4 described above, wherein a weight average molecular weight of the polysiloxane represented by formula (1) is from 500 to 2,300.
6. The rubber composition for a tire tread according to any one of 1 to 5 described above further containing a terpene resin, wherein the amount of the terpene resin is from 1 to 30 parts by mass per 100 parts by mass of the diene rubber component, and the terpene resin is an aromatic modified terpene resin having a softening point from 60 to 150° C.

7. The rubber composition for a tire tread according to any one of 1 to 6 described above, wherein a vinyl bond content derived from the isoprene units in the isoprene block is from 5 to 85 mass %.

8. The rubber composition for a tire tread according to any one of 1 to 7 described above, wherein the conjugated diene copolymer block is obtained using a conjugated diene monomer (d1) and an aromatic vinyl monomer;

an aromatic vinyl unit content derived from the aromatic vinyl monomer is from 38 to 48 mass % of the conjugated diene rubber part; and a vinyl bond content of the conjugated diene rubber part is from 20 to 35 mol % of the conjugated diene units constituting the conjugated diene rubber part.

9. The rubber composition for a tire tread according to any one of 1 to 8 described above, wherein a weight average molecular weight of the modified conjugated diene rubber is from 1,000 to 3,000,000.

10. The rubber composition for a tire tread according to any one of 1 to 9 described above, wherein the conjugated diene rubber part has a conjugated diene copolymer block on an end other than the end; and the modified conjugated diene rubber has the isoprene block between the conjugated diene copolymer block and the modified part.

11. The rubber composition for a tire tread according to 10 described above, wherein a weight average molecular weight of the modified conjugated diene rubber is from 600,000 to 1,000,000.

12. The rubber composition for a tire tread according to any one of 1 to 9 described above, wherein the conjugated diene rubber part has the isoprene block on an end other than the end; and the modified conjugated diene rubber has the conjugated diene copolymer block between the isoprene block and the modified part.

13. The rubber composition for a tire tread according to any one of 1 to 12 described above, wherein the functional group is an epoxy group and/or a hydrocarbyloxysilyl group.

14. A pneumatic tire having tire treads formed using the rubber composition for a tire tread according to any one of 1 to 13 described above.

As demonstrated below, according to the present technology, it is possible to provide a rubber composition for a tire tread having excellent wet performance and low rolling resistance when formed into a tire as well as excellent processability, and a pneumatic tire having tire treads formed using the rubber composition.

BRIEF DESCRIPTION OF THE DRAWINGS

FIG. 1 is a partial cross-sectional schematic view of a tire that represents one embodiment of the pneumatic tire of the present technology.

DETAILED DESCRIPTION

The rubber composition for a tire tread according to the present technology and a pneumatic tire using the rubber composition for a tire tread according to the present technology will be described hereinafter.

[Rubber Composition for Tire Tread]

The rubber composition for a tire tread according to the present technology is:

a rubber composition for a tire tread containing a diene rubber component containing at least 20 mass % of a modified conjugated diene rubber, a silica, and a silane coupling agent;

the modified conjugated diene rubber having at least one modified part and at least one conjugated diene rubber part;

the conjugated diene rubber part having a conjugated diene copolymer block and an isoprene block containing from 70 mass % to 100 mass % of isoprene units in each conjugated diene rubber part;

the modified part bonding to an end of the conjugated diene rubber part;

the modified part having a functional group which interacts with the silica;

the silane coupling agent being a polysiloxane represented by the following formula (1);

a content of the silica being from 60 to 200 parts by mass per 100 parts by mass of the diene rubber component; and the content of the silane coupling agent being from 1 to 20 mass % of the content of the silica.

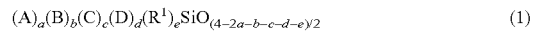

$$(A)_a(B)_b(C)_c(D)_d(R^1)_e SiO_{(4-2a-b-c-d-e)/2} \quad (1)$$

[Formula (1) is an average composition formula, and in formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $0 \leq b < 1$, $0 < c < 3$, $0 < d < 1$, $0 \leq e < 2$, and $0 < 2a+b+c+d+e < 4$. However, either a or b is not 0.]

In the present technology, the rubber composition for a tire tread according to the present technology is also called the "composition of the present technology". In addition, the polysiloxane represented by formula (1) is also referred to as the "polysiloxane represented by the average composition formula of formula (1)".

The composition of the present technology has excellent wet performance, low rolling resistance, and processability as a result of using the polysiloxane represented by the average composition formula of formula (1) as a sulfur-containing silane coupling agent in a rubber composition containing a diene rubber containing a modified conjugated diene rubber and a silica.

In the present technology, the polysiloxane represented by the average composition formula of formula (1) makes it possible to blend silica into the rubber composition in a large quantity and to sufficiently disperse a large amount of silica into the rubber composition.

The present inventors believe that the rubber composition of the present technology achieves the effects described above as follows.

The skeleton of the sulfur-containing silane coupling agent contained in the rubber composition of the present technology [polysiloxane represented by the average composition formula of formula (1)] is a siloxane structure. In addition, when the sulfur-containing silane coupling agent has a monovalent hydrocarbon group having from 5 to 10 carbon atoms represented by B, B may function as an effective protecting group with respect to the mercapto group. Therefore, the vicinity of the mercapto group of the sulfur-containing silane coupling agent is thought to be even bulkier than a conventional mercaptosilane due to the siloxane structure of the skeleton, and also due to the presence of B when the agent contains B.

The mercapto group of the sulfur-containing silane coupling agent is protected by such a bulky structure, so the Mooney scorch time of the rubber composition for a tire tread according to the present technology is long, and the processing stability is secured.

However, in the present technology, it can be said that such a bulky structure of the sulfur-containing silane coupling agent does not inhibit the acceleration of the vulcanization rate at the time of vulcanization. It is thought that the mercapto group of the sulfur-containing silane coupling agent can interact and/or react with the diene rubber as a result of heating or the like at the time of vulcanization. Therefore, the composition of the present technology can achieve both processing stability and a fast vulcanization rate at the time of vulcanization.

In addition, the sulfur-containing silane coupling agent may have better affinity and reactivity with silica than conventional mercaptosilanes since it has a hydrolyzable group represented by C and a siloxane structure. Furthermore, when the molecular weight of the sulfur-containing silane coupling agent is within an appropriate range, it is anticipated that the affinity and reactivity with silica will be even better. It is thought that the rubber composition of the present technology achieves excellent wet performance and abrasion resistance due to these factors.

In addition, in the present technology, the modified part of the modified conjugated diene rubber promotes the dispersibility of the silica, which in turn promotes a reaction (silanization) of the silica and the sulfur-containing silane coupling agent [for example, the polysiloxane represented by formula (1)], and this is thought to lead to a further improvement in the dispersibility of the silica.

Due to such reasons, the rubber composition of the present technology suppresses the coagulation of the silica or increases in viscosity, and the composition of the present technology can be used to produce a tire having excellent wet performance and rolling resistance.

The above mechanism is an inference by the inventors of the present application, but if the mechanism is a mechanism other than that described above, it is still within the scope of the present technology.

<Modified Conjugated Diene Rubber>

The modified conjugated diene rubber will be described hereinafter.

In the present technology, the diene rubber component contains a modified conjugated diene rubber.

In the present technology, the modified conjugated diene rubber contained in the diene rubber component has at least one modified part and at least one conjugated diene rubber part in each molecule, and the modified part binds to an end of the conjugated diene rubber part.

The modified conjugated diene rubber may have one or more modified parts and two or more conjugated diene rubber parts in each molecule. The modified conjugated diene rubber preferably has three or more conjugated diene rubber parts in each molecule.

One modified part should bind to at least one conjugated diene rubber part. One modified part can bind to one or two or more conjugated diene rubber parts. That is, in the present technology, the modified conjugated diene rubber may be a mixture in which one or more conjugated diene rubber parts binds to one modified part.

The modified conjugated diene rubber preferably contains a modified conjugated diene rubber having three or more conjugated diene rubber parts in each molecule in an amount of at least 5 mass %, more preferably from 5 to 40 mass %, and particularly preferably from 10 to 30 mass % of the entire amount of the modified conjugated diene rubber.

In the present technology, the weight average molecular weight of the modified conjugated diene rubber is preferably from 1,000 to 3,000,000.

In addition, the molecular weight distribution (Mw/Mn) of the modified conjugated diene rubber is not particularly limited but is preferably from 1.1 to 3.0, more preferably from 1.2 to 2.5, and particularly preferably from 1.3 to 2.2. When the molecular weight distribution (Mw/Mn) is at most 3.0, the resulting tire has superior low rolling resistance.

The Mooney viscosity ($ML_{1+4}(100°\ C.)$) of the modified conjugated diene rubber is also not particularly limited but is ordinarily in the range from 20 to 100, preferably from 30 to 90, and more preferably from 40 to 85. When the modified conjugated diene rubber is formed as an oil-extended rubber, the Mooney viscosity of the oil-extended rubber is preferably set to the range described above.

(Modified Part)

In the present technology, the modified part has a functional group which interacts with the silica.

The functional part which interacts with the silica corresponds to a functional group which interacts with silica in a modifier used to produce the modified conjugated diene rubber as described below.

The functional group which interacts with the silica may be a group of the same type as a reactive group capable of reacting with the active terminal of the modifier.

The functional group which interacts with the silica may also be a group produced after a reaction between the active terminal and the reactive group capable of reacting with the active terminal of the modifier.

Examples of functional groups which interact with the silica include hydrocarbyloxysilyl groups, silanol groups, hydroxyl groups (excluding silanol groups), aldehyde groups, carboxyl groups, amino groups, imino groups, epoxy groups, amide groups, thiol groups, and ether bonds.

Of these, the functional group is preferably an epoxy group and/or a hydrocarbyloxysilyl group. The hydrocarbyloxysilyl group has a silicon atom and a hydrocarbyloxy group (—OR: here, R is a hydrocarbon group or an aryl group).

Examples of hydrocarbyloxysilyl groups include alkoxysilyl groups such as methoxysilyl groups, ethoxysilyl groups, propoxysilyl groups, and butoxysilyl groups; and aryloxysilyl groups such as phenoxysilyl groups. Of these, alkoxysilyl groups are preferable, and ethoxysilyl groups are more preferable.

A preferable example of a hydrocarbon group having an epoxy group is a group represented by the following general formula (VI).

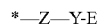   General formula (VI):

In formula (VI), Z is an alkylene group or an alkyl arylene group having from 1 to 10 carbon atoms, Y is a methylene group, a sulfur atom, or an oxygen atom, and E is a hydrocarbon group with from 2 to 10 carbon atoms having an epoxy group. Of these, Y is preferably an oxygen atom; it is more preferable for Y to be an oxygen atom and for E to be a glycidyl group; and it is particularly preferable for Z to be an alkylene group having 3 carbon atoms, for Y to be an oxygen group, and for E to be a glycidyl group. * indicates a binding position.

The skeleton of the modified part is preferably a polyorganosiloxane from the perspective of having superior wet performance, low rolling resistance, and processability and having excellent abrasion resistance.

The polyorganosiloxane may be a straight-chain substance, a branched substance, a cyclic substance, or a combination thereof.

The hydrocarbon group of the polyorganosiloxane is not particularly limited. Examples thereof include aliphatic hydrocarbon groups, alicyclic hydrocarbon groups, aromatic hydrocarbon groups, and combinations thereof. Specific examples thereof include alkyl groups having from 1 to 6 carbon atoms and aryl groups having from 6 to 12 carbon atoms.

The functional group which interacts with the silica and the polyorganosiloxane can form a bind directly or via a hydrocarbon group. The hydrocarbon group is not particularly limited.

In addition to the hydrocarbon group and the functional group which interacts with the silica, the polyorganosiloxane may have a polyoxyalkylene group in the side chain. An example of a polyoxyalkylene group is a group containing repeating from 2 to 20 units of alkylene glycol, and a specific example thereof is a group represented by the following formula (A6).

[Formula A6]

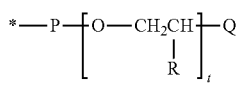

Formula (A6)

In formula (A6), t is an integer from 2 to 20, P is an alkylene group or an alkyl arylene group having from 2 to 10 carbon atoms, R is a hydrogen atom or a methyl group, and Q is an alkoxy group or an aryloxy group having from 1 to 10 carbon atoms. In formula (A6), * indicates a binding position. Of these, a substance in which t is an integer from 2 to 8, P is an alkylene group having 3 carbon atoms, R is a hydrogen atom, and Q is a methoxy group is preferable.

The modified part is preferably polyorganosiloxane having a functional group which interacts with the silica from the perspective of having superior wet performance, low rolling resistance, and processability and having excellent abrasion resistance.

(Conjugated Diene Rubber Part)

In the present technology, the modified conjugated diene rubber has at least one conjugated diene rubber part, and each conjugated diene rubber part has a conjugated diene copolymer block and an isoprene block containing from 70 to 100 mass % of isoprene units.

Isoprene Block

The content of isoprene units in the isoprene block is preferably at least 80 mass %, more preferably at least 90 mass %, and particularly preferably 100 mass %.

The other monomer (d2) that can be copolymerized with the isoprene used to obtain the isoprene block is not particularly limited as long as it can be copolymerized with isoprene. For example, 1,3-butadiene, styrene, α-methylstyrene, and the like can be used. Of these, styrene is preferable. The content of other monomer units in the isoprene block is less than 30 mass %, preferably less than 20 mass %, and more preferably less than 10 mass %, and it is particularly preferable not to contain any monomers other than isoprene units.

The vinyl bond content derived from isoprene units in the isoprene block is preferably from 5 to 85 mass %, more preferably from 21 to 85 mass %, even more preferably from 50 to 80 mass %, and particularly preferably from 70 to 80 mass % in that the wet performance is superior. The vinyl bond content derived from isoprene units is the proportion (mass %) of the total of units of 1,2-vinyl bonds derived from isoprene units and units of 3,4-vinyl bonds derived from isoprene units.

The weight average molecular weight of the isoprene block is not particularly limited but is preferably from 500 to 25,000, more preferably from 1,000 to 15,000, and particularly preferably from 1,500 to 10,000 from the perspective of strength.

The molecular weight distribution, which is expressed as the ratio (Mw/Mn) of the weight average molecular weight (Mw) to the number average molecular weight (Mn) of the isoprene block, is not particularly limited but is preferably from 1.0 to 1.5, more preferably from 1.0 to 1.4, and particularly preferably from 1.0 to 1.3 from the perspective of productivity.

The vinyl bond content in portions other than the isoprene block in this case is preferably from 10 to 90 mass % and more preferably from 20 to 80 mass % from the perspective of the balance between the viscoelastic characteristics and strength. Here, the vinyl bond content in portions other than the isoprene block is the proportion (mass %) of vinyl bond units in portions other than the isoprene block in the conjugated diene rubber part.

Conjugated Diene Copolymer Block

In the present technology, the conjugated diene copolymer block can be obtained, for example, using a conjugated diene monomer (d1) and an aromatic vinyl monomer.

Examples of the conjugated diene monomer (d1) constituting the conjugated diene copolymer block include 1,3-butadiene, isoprene(2-methyl-1,3-butadiene), 2,3-dimethyl-1,3-butadiene, 2-chloro-1,3-butadiene, and 1,3-pentadiene. A single conjugated diene monomer (d1) can be used alone, or a combination of two or more types can be used.

Examples of the aromatic vinyl monomer constituting the conjugated diene copolymer block include styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethylaminoethylstyrene, and vinyl pyridine. A single aromatic vinyl monomer can be used alone, or a combination of two or more types can be used.

Examples of other monomers that can be used in addition to the conjugated diene monomer (d1) and the aromatic vinyl monomer constituting the conjugated diene copolymer block include α, β-unsaturated nitriles such as acrylonitrile and methacrylonitrile; unsaturated carboxylic acids or acid anhydrides such as acrylic acids, methacrylic acids, and maleic anhydride; unsaturated carboxylic acid esters such as methyl methacrylate, ethyl acrylate, and butyl acrylate; and non-conjugated dienes such as 1,5-hexadiene, 1,6-heptadiene, 1,7-octadiene, dicyclopentadiene, and 5-ethylidene-2-norbornane. The used amount of these monomers is preferably at most 5 mass % of all monomers constituting the conjugated diene block.

A preferable example of a combination of the conjugated diene monomer (d1) and the aromatic vinyl monomer constituting the conjugated diene copolymer block is a combination of butadiene, isoprene, and styrene.

The aromatic vinyl unit content derived from the aromatic vinyl monomer described above is from 38 to 48 mass %, preferably from 38 to 45 mass %, and more preferably from 40 to 45 mass % of the conjugated diene rubber part from the perspective of having superior wet performance, low rolling resistance, and processability and having excellent abrasion resistance.

In addition, the vinyl bond content of the conjugated diene rubber part is from 20 to 35 mol %, preferably from 23 to 35 mass %, and more preferably from 26 to 34 mass % of the conjugated diene units constituting the conjugated diene rubber part from the perspective of having superior wet performance, low rolling resistance, and processability and having excellent abrasion resistance. The vinyl units of the conjugated diene rubber part may be vinyl units derived from the conjugated diene monomer constituting the entire conjugated diene rubber part.

In the present technology, the conjugated diene rubber part may have the conjugated diene copolymer block or the isoprene block described above on an end other than the end binding to the modified part (this is also simply called the "end" hereafter).

<When the Conjugated Diene Rubber Part has the Conjugated Diene Copolymer Block on the End>

In this case, the modified conjugated diene rubber preferably has the isoprene block between the conjugated diene copolymer block and the modified part from the perspective of having superior wet performance, low rolling resistance, and processability and having excellent abrasion resistance.

When the conjugated diene rubber part has the conjugated diene copolymer block on the end, the weight average molecular weight of the modified conjugated diene rubber is preferably from 600,000 to 1,000,000, more preferably from 600,000 to 900,000, and even more preferably from 650,000 to 850,000 from the perspective of having superior wet performance, low rolling resistance, and processability and having excellent abrasion resistance.

<When the Conjugated Diene Rubber Part has the Isoprene Block on the End>

In this case, the modified conjugated diene rubber preferably has the conjugated diene copolymer block between the isoprene block and the modified part from the perspective of having superior wet performance, low rolling resistance, and processability and having excellent abrasion resistance.

The weight average molecular weight of the isoprene block, the molecular weight distribution, and the vinyl bond content in portions other than the isoprene block are the same as those described above.

<Production Method for the Modified Conjugated Diene Rubber>

The production method for the modified conjugated diene rubber is not particularly limited. An example is a production method having: a polymerization step in which a conjugated diene rubber chain having an active terminal is obtained by performing solution polymerization on the conjugated diene monomer (d1) and the aromatic vinyl monomer (these are collectively called "monomers for the conjugated diene copolymer block" hereafter), isoprene (this is called a "monomer for the isoprene block" hereafter; this includes cases where the monomers (d2) described below are contained), and other monomers (d2) which can be used as necessary and can be copolymerized with isoprene in a hydrocarbon solvent using an organic active metal compound as a polymerization initiator; and a modification step in which the conjugated diene rubber chain and a modifier having at least one reactive group capable of reacting with the active terminal and at least one functional group which can interact with the silica are reacted.

(Polymerization Step)

In the polymerization step, a conjugated diene rubber chain having an active terminal (polymerization active terminal or a living growth terminal) is obtained by performing solution polymerization on the monomers described above in a hydrocarbon solvent using an organic active metal compound as a polymerization initiator. The order in which the monomers for the conjugated diene copolymer block and the monomer for the isoprene block are polymerized is not particularly limited, and either may be polymerized first.

Solution polymerization is not particularly limited. The hydrocarbon solvent that is used may be any solvent that is ordinarily used, examples of which include cyclohexane, n-hexane, benzene, and toluene.

Examples of the organic active metal compound used in the polymerization reaction include organic alkali metal compounds, specific examples of which include organic monolithium compounds such as n-butyllithium, sec-butyllithium, t-butyllithium, hexyllithium, phenyllithium, and stilbenelithium; organic polyvalent lithium compounds such as dilithiomethane, 1,4-dilithiobutane, 1,4-dilithio-2-ethylcyclohexane, and 1,3,5-trilithiobenzene; organic sodium compounds such as sodium naphthalene; organic potassium compounds such as potassium naphthalene; 3,3-(N,N-diethylamino)-1-propyllithium, 3-(N,N-diethylamino)-1-propyllithium, 3-(N,N-dipropylamino)-1-propyllithium, 3-morpholino-1-propyllithium, 3-imidazole-1-propyllithium, and organic lithium compounds in which the chains thereof are extended by 1 to 10 units of butadiene, isoprene, or styrene.

A single organic active metal compound can be used alone, or a combination of two or more types can be used.

In the polymerization reaction, polar compounds including ethers such as diethyl ether, diethylene glycol dimethyl ether, tetrahydrofuran, and 2,2-bis(2-oxolanyl)propane and amines such as triethylamine and N,N,N',N'-tetramethylethylene diamine may also be added for the purpose of copolymerizing the aromatic vinyl monomer with the conjugated diene monomer at random.

(Modification Step)

In the modification step, a modified conjugated diene rubber is produced by reacting the conjugated diene rubber chain obtained in the polymerization step described above and a modifier having at least one reactive group capable of reacting with the active terminal and at least one functional group which interacts with the silica. The modifier preferably has a total of at least three reactive groups capable of reacting with the active terminal and functional groups which interact with the silica.

The modifier used in the modification step may have a reactive group capable of reacting with the active terminal and a modified part (the modified part has a functional group which interacts with the silica). The reactive group capable of reacting with the active terminal may be the same as or different from the functional group which interacts with the silica.

The reactive group capable of reacting with the active terminal in the modifier is not particularly limited. Examples thereof include the same groups as the functional groups which interact with the silica.

As a modifier, when a polyorganosiloxane having a hydrocarbyloxysilyl group is reacted with the active terminal of the conjugated diene rubber chain as a modifier, for example, the bonds between the hydrocarbyloxyl groups and silicon atoms in the hydrocarbyloxysilyl group are broken, and the conjugated diene rubber chain can directly bond with the silicon atoms to form single bonds.

In addition, as a modifier, when a polyorganosiloxane having a hydrocarbon group containing an epoxy group is reacted with the active terminal of the conjugated diene rubber chain, for example, the carbon-oxygen bonds constituting the epoxy ring are broken, and a structure in which a polymer chain binds to the carbon atoms thereof can be formed.

The modifier is preferably a polyorganosiloxane having at least one reactive group capable of reacting with the active terminal and at least one functional group which interacts with the silica. The polyorganosiloxane is the same as the polyorganosiloxane of the modified part described above.

Examples of modifiers include a polyorganosiloxane represented by the formula (A1) below, a polyorganosiloxane represented by the formula (A2) below, a polyorganosiloxane represented by the formula (A3) below, and a hydrocarbyloxysilane represented by the formula (A4) below. Of these, a polyorganosiloxane represented by the formula (A1) below, a polyorganosiloxane represented by the formula (A2) below, and a polyorganosiloxane represented by the formula (A3) below are preferable, and a polyorganosiloxane represented by the formula (A1) below is more preferable.

[Formula A1]

Formula (A1)

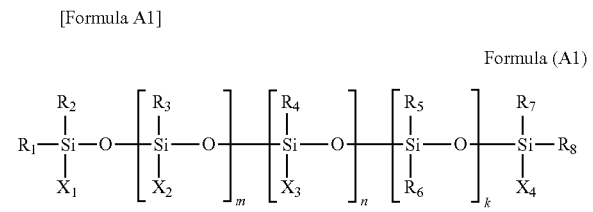

In formula (A1), $R_1$ to $R_8$ are alkyl groups having from 1 to 6 carbon atoms or aryl groups having from 6 to 12 carbon atoms, and these may be the same as or different from one another. In formula (A1), $X_1$ and $X_4$ are reactive groups capable of reactive with the active terminal, functional groups which interact with the silica (for example, alkoxy groups having from 1 to 5 carbon atoms, aryloxy groups having from 6 to 14 carbon atoms, or groups having from 4 to 12 carbon atoms containing epoxy groups), alkyl groups having from 1 to 6 carbon atoms, or aryl groups having from 6 to 12 carbon atoms, and $X_1$ and $X_4$ may be the same as or different from one another. In formula (A1), $X_2$ is a reactive group capable of reacting with the active terminal or a functional group which interacts with the silica (for example, alkoxy groups having from 1 to 5 carbon atoms, aryloxy groups having from 6 to 14 carbon atoms, or groups having from 4 to 12 carbon atoms containing epoxy groups). In formula (A1), $X_3$ is a group containing from 2 to 20 repeating units of alkylene glycol. In formula (A1), m is an integer from 3 to 200, n is an integer from 0 to 200, and k is an integer from 0 to 200.

In the polyorganosiloxane represented by formula (A1), m is preferably an integer from 20 to 150 and more preferably an integer from 30 to 120 from the perspective of having superior wet performance, low rolling resistance, and scorch resistance.

In the polyorganosiloxane represented by formula (A1), n is preferably an integer from 0 to 150 and more preferably an integer from 0 to 120. In addition, in the polyorganosiloxane represented by formula (A1), k is preferably an integer from 0 to 150 and more preferably an integer from 0 to 120.

In the polyorganosiloxane represented by formula (A1), the total of m, n, and k is preferably at most 400, more preferably at most 300, and particularly preferably at most 250. When the total of m, n, and k is at most 400, the production of the polyorganosiloxane itself becomes easy, and the viscosity does not become too high, which makes it easy to handle.

[Formula A2]

Formula (A2)

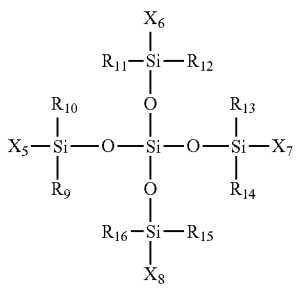

In formula (A2), $R_9$ to $R_{16}$ are alkyl groups having from 1 to 6 carbon atoms or aryl groups having from 6 to 12 carbon atoms, and these may be the same as or different from one another. In formula (A2), $X_5$ to $X_8$ are reactive groups capable of reacting with the active terminal or functional groups which interact with the silica (for example, alkoxy groups having from 1 to 5 carbon atoms, aryloxy groups having from 6 to 14 carbon atoms, or groups having from 4 to 12 carbon atoms containing epoxy groups), and these may be the same as or different from one another.

In the polyorganosiloxane represented by formula (A2), the specific examples and preferred aspects of $R_9$ to $R_{16}$ are the same as those of $R_1$ to $R_8$ in formula (A1). In addition, in the polyorganosiloxane represented by formula (A2), the specific examples and preferred aspects of $X_5$ to $X_8$ are the same as those of $X_2$ in formula (A1).

[Formula A3]

Formula (A3)

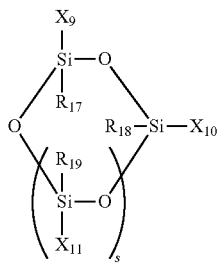

In formula (A3), $R_{17}$ to $R_{19}$ are alkyl groups having from 1 to 6 carbon atoms or aryl groups having from 6 to 12 carbon atoms, and these may be the same as or different from one another. In formula (A3), $X_9$ to $X_{11}$ are reactive groups capable of reacting with the active terminal or functional groups which interact with the silica (for example, alkoxy groups having from 1 to 5 carbon atoms, aryloxy groups having from 6 to 14 carbon atoms, or groups having from 4 to 12 carbon atoms containing epoxy groups), and these may be the same as or different from one another. In formula (A3), s is an integer from 1 to 18.

In the polyorganosiloxane represented by formula (A3), the specific examples and preferred aspects of $R_{17}$ to $R_{19}$ are the same as those of $R_1$ to $R_8$ in formula (A1). In addition, in the polyorganosiloxane represented by formula (A3), the specific examples and preferred aspects of $X_9$ to $X_{11}$ are the same as those of $X_2$ in formula (A1).

[Formula A4]

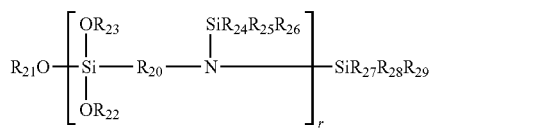

Formula (A4)

In formula (A4), $R_{20}$ is an alkylene group having from 1 to 12 carbon atoms. In formula (A4), $R_{21}$ to $R_{29}$ are alkyl groups having from 1 to 6 carbon atoms or aryl groups having from 6 to 12 carbon atoms, and these may be the same as or different from one another. In formula (A4), r is an integer from 1 to 10.

In the hydrocarbyloxysilane represented by formula (A4), examples of the alkylene group having from 1 to 12 carbon atoms represented by $R_{20}$ include methylene groups, ethylene groups, and propylene groups. Of these, propylene groups are preferable.

In the hydrocarbyloxysilane represented by formula (A4), the specific examples and preferred aspects of $R_{21}$ to $R_{29}$ are the same as those of $R_1$ to $R_8$ in formula (A1).

Specific examples of the hydrocarbyloxysilane represented by formula (A4) include N,N-bis(trimethylsilyl)-3-aminopropyltrimethoxysilane, N,N-bis(trimethylsilyl)-3-aminopropyltriethoxysilane, N,N-bis(trimethylsilyl) aminoethyltrimethoxysilane, and N,N-bis(trimethylsilyl) aminoethyltriethoxysilane. Of these, it is preferable to use N,N-bis(trimethylsilyl)-3-aminopropyltrimethoxysilane and N,N-bis(trimethylsilyl)-3-aminopropyltriethoxysilane.

A single modifier can be used alone, or a combination of two or more types can be used.

The reaction conditions of the conjugated diene rubber chain and the modifier are not particularly limited.

After the modifier is reacted, it is preferable to deactivate the active terminal by adding an alcohol such as methanol or water.

After the active terminal is deactivated as described above, and after an antiaging agent such as a phenol-based stabilizer, a phosphorus-based stabilizer, or a sulfur-based stabilizer, a crumbing agent, an antiscalant, and the like are added to the polymerization solution as desired, the polymerization solvent can be separated from the polymerization solution by direct drying or steam stripping so as to obtain a modified conjugated diene rubber. In addition, before the polymerization solvent is separated from the polymerization solution, an extender oil may be mixed into the polymerization solution and the modified conjugated diene rubber may be recovered as an oil-extended rubber. The type and amount of the extender oil are not particularly limited.

The modified conjugated diene rubber can be produced with the method described above. In addition, Japanese Patent No. 5240409B and Japanese Unexamined Patent Application Publication No. 2012-131983A, for example, can be referenced for the production method of the modified conjugated diene rubber.

A single modified conjugated diene rubber can be used alone, or a combination of two or more types can be used.
<Diene Rubber>

The rubber component contained in the composition of the present technology may contain a diene rubber other than the modified conjugated diene rubber.

The diene rubber is not particularly limited, but specific examples thereof include natural rubber (NR), isoprene rubber (IR), butadiene rubber (BR), aromatic vinyl-conjugated diene copolymer rubber, acrylonitrile butadiene copolymer rubber (NBR), butyl rubber (IIR), halogenated butyl rubber (Br-IIR, Cl-IIR), and chloroprene rubber (CR). One type of diene rubber may be used alone, or two or more types of diene rubbers may be used in combination.

In the present technology, the diene rubber component contains at least 20 mass % of the modified conjugated diene rubber, and the amount of the modified conjugated diene rubber in the diene rubber component is preferably from 25 to 95 mass % and more preferably from 30 to 80 mass % from the perspective of having superior wet performance, low rolling resistance, and processability and having excellent abrasion resistance.
<Silica>

The silica contained in the composition of the present technology is not particularly limited, and any conventionally known silica that is blended into rubber compositions in applications such as tires can be used.

Examples of the silica include wet silica, dry silica, fumed silica, and diatomaceous earth. One type of silica may be used alone, or two or more types of silicas may be used in combination.

The cetyltrimethylammonium bromide (CTAB) adsorption specific surface area of the silica is preferably from 100 to 300 $m^2/g$ and more preferably from 140 to 260 $m^2/g$ in that the wet performance, low rolling resistance, and mixing processability are superior.

Here, the CTAB adsorption specific surface area is an alternative characteristic of the surface area of the silica that can be used in the adsorption to the silane coupling agent and is a value determined by measuring the amount of CTAB adsorption to the silica surface in accordance with JIS K6217-3:2001 "Part 3: How to Determine Specific Surface Area—CTAB Adsorption Method".

In the composition of the present technology, the content of the silica is from 60 to 200 parts by mass per 100 parts by mass of the rubber component and is preferably from 60 parts by mass, more preferably from 65 to 145 parts by mass, and even more preferably from 70 to 140 parts by mass in that the wet performance, low rolling resistance, and mixing processability are superior.
<Silane Coupling Agent>

The silane coupling agent contained in the composition of the present technology is a polysiloxane represented by the following formula (1).

$$(A)_a(B)_b(C)_c(D)_d(R^1)_e SiO_{(4-2a-b-c-d-e)/2} \quad (1)$$

[Formula (1) is an average composition formula, and in formula (1), A is a divalent organic group containing a sulfide group; B is a monovalent hydrocarbon group having from 5 to 10 carbon atoms; C is a hydrolyzable group; D is an organic group containing a mercapto group; $R^1$ is a monovalent hydrocarbon group having from 1 to 4 carbon atoms; and a to e satisfy the relational expressions $0 \leq a < 1$, $5 \leq b < 1$, $0 < c < 3$, $0 < d < 1$, $0 \leq e < 2$, and $0 < 2a+b+c+d+e < 4$. However, either a or b is not 0.]

In the present technology, since the silane coupling agent contains C, it has excellent affinity and/or reactivity with silica.

Since the silane coupling agent contains D, it can interact and/or react with the diene rubber, which yields excellent wet performance and abrasion resistance.

When the silane coupling agent has A, the wet performance and processability (in particular, the maintenance and prolongation of the Mooney scorch time) are superior, and the abrasion resistance is excellent.

When the silane coupling agent contains B, the mercapto group is protected, and the Mooney scorch time becomes longer, while at the same time, the processability is excellent due to outstanding affinity with the rubber.

The silane coupling agent contained in the composition of the present technology has a polysiloxane skeleton as its skeleton.

In formula (1), A is a divalent organic group containing a sulfide group (also called a sulfide group-containing organic group hereafter). Of these, a group represented by formula (2) is preferable.

$$*-(CH_2)_n-S_x-(CH_2)_n-* \quad (2)$$

In formula (2), n is an integer from 1 to 10, among which an integer from 2 to 4 is preferable.

In formula (2), x is an integer from 1 to 6, among which an integer from 2 to 4 is preferable.

In formula (2), * indicates a binding position.

Specific examples of the group represented by formula (2) include *—$CH_2$—$S_2$—$CH_2$—*, *—$C_2H_4$—$S_2$—$C_2H_4$—*, *—$C_3H_6$—$S_2$—$C_3H_6$—*, *—$C_4H_8$—$S_2$—$C_4H_8$—*, *—$CH_2$—$S_4$—$CH_2$—*, *—$C_2H_4$—$S_4$—$C_2H_4$—*, *—$C_3H_6$—$S_4$—$C_3H_6$—*, and *—$C_4H_8$—$S_4$—$C_4H_8$—*.

In formula (1), B is a monovalent hydrocarbon group having from 5 to 10 carbon atoms, specific examples of which include hexyl groups, octyl groups, and decyl groups.

In formula (1), C is a hydrolyzable group, specific examples of which include alkoxy groups, phenoxy groups, carboxyl groups, and alkenyloxy groups. Of these, a group represented by the following formula (3) is preferable.

$$*-OR^2 \quad (3)$$

In formula (3), $R^2$ is an alkyl group having from 1 to 20 carbon atoms, an aryl group having from 6 to 10 carbon atoms, an aralkyl group (aryl alkyl group) having from 6 to 10 carbon atoms, or an alkenyl group having from 2 to 10 carbon atoms, among which an alkyl group having from 1 to 5 carbon atoms is preferable. Specific examples of the alkyl group having from 1 to carbon atoms include a methyl group, an ethyl group, a propyl group, a butyl group, a hexyl group, an octyl group, a decyl group, an octadecyl group, and the like. Specific examples of the aryl group having from 6 to 10 carbon atoms include a phenyl group, a tolyl group, and the like. Specific examples of the aralkyl group having from 6 to 10 carbon atoms include a benzyl group, a phenylethyl group, and the like. Specific examples of the alkenyl group having from 2 to 10 carbon atoms include a vinyl group, a propenyl group, and a pentenyl group.

In formula (3), * indicates a binding position.

In formula (1), D is an organic group containing a mercapto group. Of these, a group represented by the following formula (4) is preferable.

$$*-(CH_2)_m-SH \quad (4)$$

In formula (4), m is an integer from 1 to 10, among which an integer from 1 to 5 is preferable.

In formula (4), * indicates a binding position.

Specific examples of the group represented by formula (4) include *—$CH_2SH$, *—$C_2H_4SH$, *—$C_3H_6SH$, *—$C_4H_8SH$, *—$C_5H_{10}SH$, *—$C_6H_{12}SH$, *—$C_7H_{14}SH$, *—$C_8H_{16}SH$, *—$C_9H_{18}SH$, and *—$C_{10}H_{20}SH$.

In formula (1), $R^1$ is a monovalent hydrocarbon group having from 1 to 4 carbon atoms.

In formula (1), the relational expressions $0 \leq a < 1$, $0 \leq b < 1$, $0 < c < 3$, $0 < d < 1$, $0 \leq e < 2$, and $0 < 2a+b+c+d+e < 4$ are satisfied. However, either a or b is not 0.

The value of (a) of the polysiloxane represented by the average composition formula of formula (1) is preferably greater than 0 (0<a) in that the resulting processability is superior. That is, the substance preferably has a sulfide group-containing organic group. Of these, it is preferable for the expression $0 < a \leq 0.50$ to be satisfied in that the processability is even better and the wet performance and low rolling resistance are also superior.

In addition, the value of (a) of the polysiloxane represented by the average composition formula of formula (1) is preferably 0 in that the wet performance and low rolling resistance are superior. That is, a case where the substance does not have a sulfide-containing organic group is a preferred aspect.

In formula (1), b is preferably greater than 0 and preferably satisfies the expression $0.10 \leq b \leq 0.89$ in that the wet characteristics, low rolling resistance, and processability are superior.

In formula (1), c preferably satisfies the expression $1.2 \leq c \leq 2.0$ in that the wet characteristics, low rolling resistance, and processability are superior and the silica dispersibility is superior.

In formula (1), d preferably satisfies the expression $0.1 \leq d \leq 0.8$ in that the wet characteristics, low rolling resistance, and processability are superior.

The polysiloxane represented by the average composition formula of formula (1) is preferably a polysiloxane in which, A in formula (1) is a group represented by formula (2), C in formula (1) is a group represented by formula (3), and D in formula (1) is a group represented by formula (4) in that the silica dispersibility is good and the processability is superior.

The weight average molecular weight of the polysiloxane represented by formula (1) is preferably from 500 to 2,300 and more preferably from 600 to 1,500 from the perspective of having superior wet performance, low rolling resistance, and processability and having excellent silica dispersibility while securing scorch resistance. The molecular weight of the polysiloxane is the weight average molecular weight determined in terms of polystyrene by gel permeation chromatography (GPC) using toluene as a solvent.

The mercapto equivalent weight of the polysiloxane determined by the acetic acid/potassium iodide/potassium iodate addition-sodium thiosulfate solution titration method is preferably from 550 to 1,900 g/mol and more preferably from 600 to 1,800 g/mol, from the perspective of having excellent vulcanization reactivity.

No metals other than silicon atoms (for example, Sn, Ti, or Al) are present in the skeleton of the specific polysiloxane described above.

The method for producing the polysiloxane is not particularly limited. A preferred aspect is a method of hydrolyzing and condensing an organosilicon compound represented by the following formula (6) and an organosilicon compound represented by the following formula (7). Furthermore, an organosilicon compound represented by the following formula (5) may also be used. In addition, an organosilicon compound represented by the following formula (8) may also be used.

Of these, it is preferable to use at least organosilicon compounds represented by formula (6), formula (7), and formula (5) in that the processability such as scorch resistance is superior.

In addition, it is preferable to use at least organosilicon compounds represented by formula (6) and formula (7) in that the wet performance and abrasion resistance are superior and in that the tire performance such as low rolling resistance is excellent.

[Formula 5]

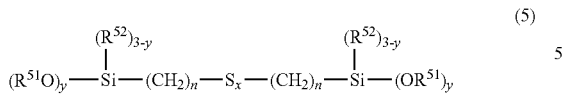

(5)

In formula (5), $R^{51}$ is an alkyl group having from 1 to 20 carbon atoms, an aryl group having from 6 to 10 carbon atoms, or an alkenyl group having from 2 to 10 carbon atoms, among which an alkyl group having from 1 to 5 carbon atoms is preferable. Specific examples of the alkyl group having from 1 to 20 carbons include a methyl group, an ethyl group, a propyl group, a butyl group, a hexyl group, an octyl group, a decyl group, an octadecyl group, and the like. Specific examples of the aryl group having from 6 to 10 carbon atoms include a phenyl group, a tolyl group, and a naphthyl group. Specific examples of the alkenyl group having from 2 to 10 carbon atoms include a vinyl group, a propenyl group, and a pentenyl group.

In formula (5), $R^{52}$ is an alkyl group having from 1 to 10 carbon atoms or an aryl group having from 6 to 10 carbon atoms. Specific examples of the alkyl group having from 1 to 10 carbon atoms include a methyl group, an ethyl group, a propyl group, a butyl group, a hexyl group, an octyl group, and a decyl group. Specific examples of the aryl group having from 6 to 10 carbon atoms are the same as those of $R^3$ described above.

In formula (5), the definition and preferred aspects of n are the same as those of n described above.

In formula (5), the definition and preferred aspects of x are the same as those of x described above.

In formula (5), y is an integer from 1 to 3.

Specific examples of the organosilicon compound represented by formula (5) include bis(trimethoxysilylpropyl)tetrasulfide, bis(triethoxysilylpropyl)tetrasulfide, bis(trimethoxysilylpropyl)disulfide, and bis(triethoxysilylpropyl)disulfide.

[Formula 6]

(6)

In formula (6), the definition, specific examples, and preferred aspects of $R^{61}$ are the same as those of $R^{51}$ described above.

In formula (6), the definition, specific examples, and preferred aspects of $R^{62}$ are the same as those of $R^{52}$ described above.

In formula (6), the definition of z is the same as that of y described above.

In formula (6), p is an integer from 5 to 10.

Specific examples of the organosilicon compound represented by formula (6) include pentyltrimethoxysilane, pentylmethyldimethoxysilane, pentyltriethoxysilane, pentylmethyldiethoxysilane, hexyltrimethoxysilane, hexylmethyldimethoxysilane, hexyltriethoxysilane, hexylmethyldiethoxysilane, octyltrimethoxysilane, octylmethyldimethoxysilane, octyltriethoxysilane, octylmethyldiethoxysilane, decyltrimethoxysilane, decylmethyldimethoxysilane, decyltriethoxysilane, and decylmethyldiethoxysilane.

[Formula 7]

(7)

In formula (7), the definition, specific examples, and preferred aspects of $R^{71}$ are the same as those of $R^{51}$ described above.

In formula (7), the definition, specific examples, and preferred aspects of $R^{72}$ are the same as those of $R^{52}$ described above.

In formula (7), the definition and preferred aspects of m are the same as those of m described above.

In formula (7), the definition of w is the same as that of y described above.

Specific examples of the organosilicon compound represented by formula (7) include α-mercaptomethyltrimethoxysilane, α-mercaptomethylmethyldimethoxysilane, α-mercaptomethyltriethoxysilane, α-mercaptomethylmethyldiethoxysilane, γ-mercaptopropyltrimethoxysilane, γ-mercaptopropylmethyldimethoxysilane, γ-mercaptopropyltriethoxysilane, and γ-mercaptopropylmethyldiethoxysilane.

[Formula 8]

(8)

In formula (8), the definition, specific examples, and preferred aspects of $R^{81}$ are the same as those of $R^{51}$ described above.

In formula (8), the definition, specific examples, and preferred aspects of $R^{82}$ are the same as those of $R^{52}$ described above.

In formula (8), the definition of v is the same as that of y described above.

In formula (8), q is an integer from 1 to 4.

Specific examples of the organosilicon compound represented by formula (8) include methyltrimethoxysilane, dimethyldimethoxysilane, methyltriethoxysilane, methylethyldiethoxysilane, propyltrimethoxysilane, propylmethyldimethoxysilane, and propylmethyldiethoxysilane.

When a silane coupling agent having a mercapto group [for example, an organosilicon compound represented by formula (7)] and a silane coupling agent having a hydrocarbon group having from 5 to 10 carbon atoms [for example, an organosilicon compound represented by formula (6)] and/or a silane coupling agent having a hydrocarbon group having from 1 to 4 carbon atoms [for example, an organosilicon compound represented by formula (8)], for example, are used in combination as the organosilicon compounds used to produce the polysiloxane, the mixing ratio (molar ratio) of the silane coupling agent having a mercapto group and the silane coupling agent having a hydrocarbon group with from 5 to 10 carbon atoms and/or a silane coupling agent having a hydrocarbon group with from 1 to 4 carbon atoms [silane coupling agent having a mercapto group/(silane coupling agent having a hydrocarbon group with from 5 to 10 carbon atoms and/or a silane coupling agent having a hydrocarbon group with from 1 to 4 carbon atoms)] is preferably from 1.1/8.9 to 6.7/3.3 and more preferably from 1.4/8.6 to 5.0/5.0 from the perspective of having superior wet performance, abrasion resistance, and processability and excellent low rolling resistance.

When a silane coupling agent having a mercapto group [for example, an organosilicon compound represented by formula (7)] and a silane coupling agent having a sulfide group [for example, an organosilicon compound represented by formula (5)], for example, are used in combination as the organosilicon compounds used to produce the polysiloxane, the mixing ratio (molar ratio) of the silane coupling agent having a mercapto group and the silane coupling agent having a sulfide group (silane coupling agent having a mercapto group/silane coupling agent having a sulfide group) is preferably from 2.0/8.0 to 8.9/1.1 and more preferably from 2.5/7.5 to 8.0/2.0 from the perspective of having superior wet performance, abrasion resistance and processability and excellent low rolling resistance.

When a silane coupling agent having a mercapto group [for example, an organosilicon compound represented by formula (7)], a silane coupling agent having a sulfide group [for example, an organosilicon compound represented by formula (5)], and a silane coupling agent having a hydrocarbon group with from 5 to 10 carbon atoms [for example, an organosilicon compound represented by formula (6)] and/or a silane coupling agent having a hydrocarbon group with from 1 to 4 carbon atoms [for example, an organosilicon compound represented by formula (8)] are used in combination as the organosilicon compounds used to produce the polysiloxane, the amount of the silane coupling agent having a mercapto group is preferably from 10.0 to 73.0% of the total amount (moles) of the three (or four) silane coupling agents listed above. The amount of the silane coupling agent having a sulfide group is preferably from 5.0 to 67.0% of the total amount of the three (or four) silane coupling agents listed above. The amount of the silane coupling agent other than a silane coupling agent having a sulfide group or a mercapto group is preferably from 16.0 to 85.0% of the total amount of the three (or four) silane coupling agents listed above.

A solvent may be used as necessary when producing the polysiloxane described above. The solvent is not particularly limited, but specific examples include aliphatic hydrocarbon solvents such as pentane, hexane, heptane, and decane, ether solvents such as diethyl ether, tetrahydrofuran, and 1,4-dioxane, amide solvents such as formamide, dimethylformamide, and N-methylpyrrolidone, aromatic hydrocarbon solvents such as benzene, toluene, and xylene, and alcohol solvents such as methanol, ethanol, and propanol.

In addition, a catalyst may be used as necessary when producing the polysiloxane represented by formula (1).

In the present technology, examples of catalysts that can be used when forming the polysiloxane represented by formula (1) include acidic catalysts such as hydrochloric acid and acetic acid; Lewis acid catalysts such as ammonium fluoride; alkali metal salts such as sodium hydroxide, potassium hydroxide, sodium carbonate, sodium acetate, potassium acetate, sodium hydrogen carbonate, potassium carbonate, potassium hydrogen carbonate, calcium carbonate, sodium methoxide, and sodium ethoxide; alkali earth metal salts; and amine compounds such as triethylamine, tributylamine, pyridine, and 4-dimethylaminopyridine.

The catalyst described above is preferably not an organic metal compound containing Sn, Ti, or Al as a metal. When such an organic metal compound is used, the metal is introduced into the polysiloxane skeleton, and it may not be possible to obtain the specific polysiloxane described above (in which no metals other than silicon atoms (for example, Sn, Ti, or Al) are present in the skeleton).

When an organic metal compound containing Sn, Ti, or Al is not used as a catalyst, metals derived from the catalyst are not introduced into the molecules of the polysiloxane (for example, metals are not introduced into the polysiloxane skeleton), and the composition of the present technology is not hardened or gelified by moisture in the air in either a normal atmosphere or a high-humidity environment, which yields excellent storage stability.

The amount of the catalyst is preferably from 0.01 to 10 parts by mass and more preferably from 0.05 to 1 parts by mass per 100 parts by mass of the organosilicon compound used as a starting material from the perspective of having superior wet performance, low rolling resistance, and processability and having excellent storage stability.

The silane coupling agent can be used alone or a combination of two or more types can be used.

In the composition of the present technology, the content of the silane coupling agent is from 1 to 20 mass % of the silica content and is preferably from 2 to 20 mass %, more preferably from 3 to 18 mass %, even more preferably from 4 to 16 mass %, and particularly preferably from 5 to 14 mass % from the perspective of having superior wet performance, low rolling resistance, and scorch resistance.

(Optional Components)

The composition of the present technology may further contain additives as necessary within a scope that does not inhibit the effect or purpose thereof.

Examples of the additives described above include various types of additives typically used in rubber compositions for tire treads such as silane coupling agents other than the silane coupling agent contained in the composition of the present technology, fillers other than silica (for example, carbon black), zinc oxide, stearic acid, antiaging agents, processing aids, aroma oils, process oils, liquid polymers, terpene resins, thermosetting resins, vulcanizing agents, and vulcanization accelerators.

The composition of the present technology preferably further contains a terpene resin in that the balance of the wet performance and low rolling resistance is superior. The terpene resin is preferably an aromatic modified terpene resin. The terpene resin and aromatic modified terpene resin are not particularly limited. Examples thereof include conventionally known substances.

The softening point of the terpene resin (in particular, an aromatic modified terpene resin) is preferably from 60 to 150° C. and more preferably from 70 to 130° C. from the perspective of having superior wet performance, low rolling resistance, and processability.

The amount of the terpene resin is preferably from 1 to 30 parts by mass and more preferably from 3 to 20 parts by mass per 100 parts by mass of the diene rubber component from the perspective of having excellent wet performance and low rolling resistance.

(Production Method of the Rubber Composition for a Tire Tread)

The method for producing the composition of the present technology is not particularly limited, and specific examples thereof include a method whereby each of the above-mentioned components is kneaded using a publicly known method and device (e.g. Banbury mixer, kneader, roll, and the like).

In addition, the composition of the present technology can be vulcanized or crosslinked under conventional, publicly known vulcanizing or crosslinking conditions.

[Pneumatic Tire]

The pneumatic tire of the present technology is a pneumatic tire having tire treads formed by using the rubber composition for a tire tread according to the present technology described above.

FIG. 1 illustrates a partial cross-sectional schematic view of a tire representing an example of an embodiment of the pneumatic tire of the present technology, but the pneumatic tire of the present technology is not limited to the embodiment illustrated in FIG. 1.

In FIG. 1, symbol 1 is a bead portion, symbol 2 is a side wall portion, and symbol 3 is a tire tread.

In addition, a carcass layer 4, in which a fiber cord is embedded, is mounted between a left-right pair of bead portions 1, and ends of the carcass layer 4 are wound by being folded around bead cores 5 and bead fillers 6 from an inner side to an outer side of the tire.

In the tire tread 3, belt layers 7 are provided along the entire periphery of the tire on the outer side of the carcass layer 4.

Additionally, rim cushions 8 are provided in parts of the bead portions 1 that are in contact with a rim.

The pneumatic tire of the present technology is not particularly limited with the exception that the rubber composition of the present technology is used for the tire treads of a pneumatic tire, and, for example, the tire can be produced with a conventionally known method. In addition to ordinary air or air with an adjusted oxygen partial pressure, inert gasses such as nitrogen, argon, and helium can be used as the gas with which the tire is filled.

EXAMPLES

The present technology will be described in further detail hereinafter using working examples, but the present technology is not limited to these examples.

<Production of Modified Conjugated Diene Rubber 1 (Conjugated Diene Copolymer Block at Terminal)>

First, 4,533 g of cyclohexane, 338.9 g (3.254 mol) of styrene, 468.0 g (8.652 mol) of butadiene, 20.0 (0.294 mol) of isoprene, and 0.189 mL (1.271 mmol) of N,N,N',N'-tetramethylethylene diamine were charged into a nitrogen-substituted autoclave reaction vessel with an internal capacity of 10 L, and stirring was begun. After the temperature of the content inside the reaction vessel was set to 50° C., 5.061 mL (7.945 mmol) of n-butyllithium was added. After the polymerization conversion reached approximately 100% and after 12.0 g of isoprene was further added and reacted for 5 minutes, 0.281 g (0.318 mmol) of a 40 mass % toluene solution of 1,6-bis(trichlorosilyl)hexane was added and reacted for 30 minutes. Furthermore, 18.3 g (0.318 mmol) of a 40 mass % xylene solution of a polyorganosiloxane A represented by the following formula (9) (same hereafter) was added and reacted for 30 minutes. Next, 0.5 mL of methanol was added and stirred for 30 minutes. A small amount of an antiaging agent (Irganox 1520, manufactured by BASF) was added to the resulting polymer solution, and after 25 parts of Fukkol Eramic 30 (manufactured by the Nippon Oil Corporation) were added as an extender oil, a solid rubber was recovered by means of steam stripping. The obtained solid rubber was dehydrated with a roller and dried in a dryer to obtain a modified conjugated diene rubber. The resulting modified conjugated diene rubber was used as modified conjugated diene rubber 1.

The modified conjugated diene rubber 1 is a terminal-modified group-containing conjugated diene copolymer and is an oil-extended product containing 25 parts by weight per 100 parts by weight of the rubber component, wherein the aromatic vinyl unit content of the conjugated diene rubber part is 42 mass %, the vinyl unit content of the conjugated diene rubber part is 32 mol % of all conjugated diene units constituting the conjugated diene rubber part, the weight average molecular weight (Mw) of the modified conjugated diene rubber 1 is 750,000, and the Tg is −25° C. The modified conjugated diene rubber 1 is a modified conjugated diene rubber (styrene butadiene rubber) obtained by solution polymerization and having an isoprene block and a conjugated diene copolymer block of styrene, butadiene, and isoprene in the conjugated diene rubber part and having a conjugated diene copolymer block at the end of the conjugated diene rubber part, wherein the other end of the conjugated diene rubber part is modified by the polyorganosiloxane A.

[Formula 9]

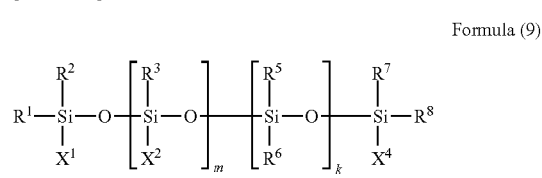

Formula (9)

In formula (9), $X^1$, $X^4$, $R^1$ to $R^3$, and $R^5$ to $R^8$ are methyl groups. In formula (9), m is 80 and k is 120. In formula (9), $X^2$ is a group represented by the following formula (10) (here, * indicates a binding position).

[Formula 10]

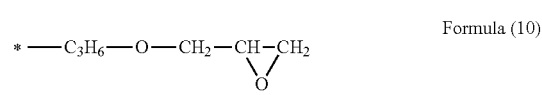

Formula (10)

<Production of Modified Conjugated Diene Rubber 2 (Isoprene Block at Terminal)>

First, 28 g of cyclohexane and 8.6 mmol of tetramethylethylene diamine were added to a 100 ml nitrogen-substituted ampoule vial, and 6.1 mmol of n-butyllithium was further added. Next, 8.0 g of isoprene was added slowly and reacted for 120 minutes in the ampoule vial at 60° C. to obtain an isoprene block (used as initiator 1). The weight average molecular weight, the molecular weight distribution, and the vinyl bond content derived from isoprene units were measured for this initiator 1. The initiator 1 had a weight average molecular weight of 2,200, a molecular weight distribution of 1.08, and a vinyl bond content derived from isoprene units of 72.3 mass %.

Next, after 4,000 g of cyclohexane, 357.7 g of 1,3-butadiene, and 132.3 g of styrene were loaded into an autoclave with a stirrer in a nitrogen atmosphere, the entire initiator 1 was added and polymerization was initiated at 40° C. Once 10 minutes passed after polymerization was initiated, 195.3 g of 1,3-butadiene and 14.7 g of styrene were continuously added over the course of 60 minutes. The maximum temperature during the polymerization reaction was 60° C. After this continuous addition was complete, the polymerization reaction was continued for 20 more minutes, and after it was confirmed that the polymerization conversion was in the range of from 95% to 100%, 0.08 mmol of 1,6-bis(trichlorosilyl)hexane was added in the state of a cyclohexane solution with a concentration of 20 mass % and reacted for 10 minutes. Furthermore, 0.027 mmol of the polyorganosilxane A represented by formula (9) was added in the state of a xylene solution with a concentration of 20 mass % and reacted for 30 minutes. Methanol was then added as a polymerization terminator in an amount equivalent to twice the molar amount of the n-butyllithium that was used so as to obtain a solution containing the modified conjugated diene rubber 2. After Irganox 1520L (manufactured by the Chiba Special Chemicals Corporation) was added as an antiaging agent to this solution in an amount of 0.15 parts by mass per 100 parts by mass of the modified conjugated diene rubber 2, the solvent was removed by steam stripping, and the solution was vacuum-dried for 24 hours at 60° C. to obtain a solid modified conjugated diene rubber 2. The modified conjugated diene rubber 2 had a styrene unit content of 21.0 mass %, a vinyl bond content of 63.3 mass %, a weight average molecular weight of 435,000, a molecular weight distribution of 1.46, a coupling rate of three or more branches of 25.0 mass %, and a Mooney viscosity of 58.0.

The weight average molecular weight, the molecular weight distribution, and the coupling rate were measured for the modified conjugated diene rubbers 1 and 2. The measurement methods are as follows.

(Weight Average Molecular Weight, Molecular Weight Distribution, and Coupling Rate)

A chart based on the molecular weight in terms of polystyrene was obtained by gel permeation chromatography, and the weight average molecular weight, the molecular weight distribution, and the coupling rate (proportion (mass %) of modified conjugated diene rubber having one modified part and three or more conjugated diene rubber parts in the modified conjugated diene rubber) were determined based on this chart. The specific measurement conditions of gel permeation chromatography are as follows.

Measurement device: HLC-820 (manufactured by the Tosoh Corporation)
Column: Two GMH-HR-H (manufactured by the Tosoh Corporation) columns were connected in series.
Detector: differential refractometer RI-8020 (manufactured by the Tosoh Corporation)
Eluant: tetrahydrofuran
Column temperature: 40° C.

Here, the coupling rate is the ratio (s2/s1) of the area (s2) of the peak portion having a peak top molecular weight of at least 2.8 times the peak top molecular weight indicated by the peak of the smallest molecular weight with respect to the total elution area (s1).

(Styrene Unit Content and Vinyl Bond Content of Modified Conjugated Diene Rubber 1)

The styrene unit content of the conjugated diene rubber part (excluding the modified part from the terminal-modified group-containing conjugated diene copolymer from the modified conjugated diene rubber; having an isoprene block and a conjugated diene copolymer block; same hereafter) and the vinyl bond content of the conjugated diene rubber part were measured by infrared spectrophotometry (Hampton's method) for the modified conjugated diene rubber 1.

(Styrene Unit Content, Vinyl Bond Content, and Mooney Viscosity of Modified Conjugated Diene Rubber 2)

The styrene unit content in portions other than the isoprene block, the vinyl bond content in portions other than the isoprene block, and the Mooney viscosity were measured for the modified conjugated diene rubber 2. The measurement methods are as follows.

The styrene unit content and the vinyl bond content were measured by $^1$H-NMR.

The Mooney viscosity ($ML_{1+4}$ (100° C.)) was measured in accordance with JIS K6300-1:2001.

<Production Method for Polysiloxane 1>

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature. It was then stirred for 2 hours at 80° C. Then, it was filtered, and 17.0 g of 5% KOH/EtOH solution was added in a dropwise manner, and stirred for 2 hours at 80° C. Then, by vacuum concentration and filtration, 480.1 g of polysiloxane in the form of a brown transparent liquid was obtained. As a result of performing measurements by GCP, the average molecular weight was 840, and the average degree of polymerization was 4.0 (preset degree of polymerization: 4.0). In addition, as a result of measuring the mercapto equivalent weight by an acetic acid/potassium iodide/potassium iodate addition/sodium thiosulfate solution titration method, the mercapto equivalent weight was 730 g/mol, and it was thus confirmed that the preset mercapto group content was achieved. The above is expressed by the following average composition formula.

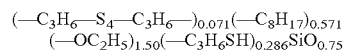

The obtained polysiloxane was used as polysiloxane 1.

<Production Method for Polysiloxane 2>

190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 162.0 g of ethanol were placed in a 2 L separable flask provided with an agitator, a reflux condenser, a dropping funnel and a thermometer, and then a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 412.3 g of polysiloxane in the form of a colorless transparent liquid was obtained. As a result of performing measurements by GCP, the average molecular weight was 850, and the average degree of polymerization was 4.0 (preset degree of polymerization: 4.0). In addition, as a result of measuring the mercapto equivalent weight by an acetic acid/potassium iodide/potassium iodate addition/sodium thiosulfate solution titration method, the mercapto equivalent weight was 650 g/mol, and it was thus confirmed that the preset mercapto group content was achieved. The above is expressed by the following average composition formula.

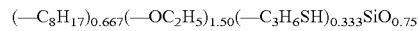

The obtained polysiloxane was used as polysiloxane 2.

<Production Method for Polysiloxane 3>

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 separable flask provided with an agitator, a reflux condenser, a dropping funnel and a thermometer, and then a mixed solution containing 42.0 g (2.33 mol) of 0.5 N hydrochloric acid and 75.6 g of ethanol was added in a dropwise manner at room temperature. It was then stirred for 2 hours at 80° C. Then, it was filtered, and 18.9 g of 5% KOH/EtOH solution was added in a dropwise manner, and stirred for 2 hours at 80° C. Then, by vacuum concentration and filtration, 560.9 g of polysiloxane in the form of a brown transparent liquid was obtained. As a result of performing measurements by GCP, the average molecular weight was 1,220, and the average degree of polymerization was 6.0 (preset degree of polymerization: 6.0). In addition, as a result of measuring the mercapto equivalent weight by an acetic acid/potassium iodide/potassium iodate addition/sodium thiosulfate solution titration method, the mercapto equivalent weight was 710 g/mol, and it was thus confirmed that the preset mercapto group content was achieved. The above is expressed by the following average composition formula.

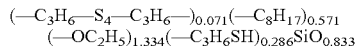

$(-OC_2H_5)_{1.334}(-C_3H_6SH)_{0.286}SiO_{0.833}$

The obtained polysiloxane was used as polysiloxane 3.
(Comparative Polysiloxane 1)

A polysiloxane was obtained by hydrolyzing 3-mercaptopropyltrimethoxysilane (0.1 mol) with water and a concentrated hydrochloric acid aqueous solution and then adding and condensing ethoxymethylpolysiloxane (100 g). The obtained polysiloxane was used as comparative polysiloxane 1.

The comparative polysiloxane 1 has a structure in which the methoxy groups of 3-mercaptopropyltrimethoxysilane and the ethoxy groups of ethoxymethylpolysiloxane are condensed. That is, the only monovalent hydrocarbon group of the comparative polysiloxane 1 is a methyl group. In addition, the comparative polysiloxane 1 does not have a divalent organic group containing a sulfide group.
(Comparative Polysiloxane 2)

A polysiloxane was obtained by hydrolyzing bis(3-(triethoxysilyl)propyl)tetrasulfide (0.1 mol) with water and a concentrated hydrochloric acid aqueous solution and then adding and condensing ethoxymethylpolysiloxane (100 g). The obtained polysiloxane was used as comparative polysiloxane 2.

The comparative polysiloxane 2 has a structure in which the ethoxy groups of bis(3-(triethoxysilyl)propyl)tetrasulfide and the ethoxy groups of ethoxymethylpolysiloxane are condensed. That is, the only monovalent hydrocarbon group of the comparative polysiloxane 2 is a methyl group. In addition, the comparative polysiloxane 2 does not have a divalent organic group containing a mercapto group.
<Production of the Rubber Composition for Tire Treads>

The components shown in the following table were blended at the proportions (parts by mass) shown in the table.

Specifically, a master batch was obtained by first mixing the components shown in the following table, excluding the sulfur and the vulcanization accelerator, for 10 minutes in a 1.7-liter closed-type Banbury mixer, discharging the mixture, and then cooling the mixture to room temperature. Further, sulfur and a vulcanization accelerator were mixed into the resulting master batch using the Banbury mixer described above so as to obtain a rubber composition for a tire tread.

In the quantities of the comparative conjugated diene rubber 1 and comparative conjugated diene rubber 2, the first numerical value is the amount of the oil-extended product, and the numerical value in parentheses is the net amount of the rubber. In addition, in the quantities of the comparative silane coupling agent 1 to the silane coupling agent 2, the first numerical value is the amount of each silane coupling agent, and the numerical value in parentheses is the mass % of each silane coupling agent with respect to the silica.

In Table 3, the amount of each rubber represents the net amount of the rubber.

The following evaluations were performed using the rubber composition for a tire tread produced as described above. The results are shown in the tables below.
<tan δ (0° C.)> (Indicator of Wet Performance)

A vulcanized rubber sheet was produced by press-vulcanizing the rubber composition for a tire tread produced as described above for 20 minutes at 160° C. in a metal mold (15 cm×15 cm×0.2 cm).

The value of tan δ (0° C.) was measured for the produced vulcanized rubber sheet under conditions with an elongation deformation distortion of 10%±2%, an oscillation frequency of 20 Hz, and a temperature of 0° C. using a viscoelastic spectrometer (produced by Iwamoto Manufacturing) in accordance with JIS K6394:2007.

The results are expressed as an index when the values of tan δ (0° C.) of Reference Examples 1 to 3 are defined as 100 in each table. Larger indices indicate larger tan δ (0° C.) values, which in turn indicates excellent wet performance when used in a tire.
<tan δ (60° C.)> (Indicator of Low Rolling Resistance)

A vulcanized rubber sheet was produced by press-vulcanizing the rubber composition (unvulcanized) for a tire tread produced as described above for 20 minutes at 160° C. in a metal mold (15 cm×15 cm×0.2 cm).

The value of tan δ (60° C.) was measured for the produced vulcanized rubber sheet under conditions with an elongation deformation distortion of 10%±2%, an oscillation frequency of 20 Hz, and a temperature of 60° C. using a viscoelastic spectrometer (produced by Iwamoto Manufacturing) in accordance with JIS K6394:2007.

The results are expressed as an index when the values of tan δ (60° C.) of Reference Examples 1 to 3 are defined as 100 in each table. Smaller index values indicate smaller tan δ (60° C.) values, which in turn indicates excellent low rolling resistance when used in a tire.
<Mooney Viscosity>

The Mooney viscosity of the rubber composition (unvulcanized) for a tire tread produced as described above was measured under conditions with a preheating time of 1 minute, a rotor rotation time of 4 minutes, and a test temperature of 100° C. using an L-shaped rotor in accordance with JIS K6300-1:2001.

The results are expressed as an index when the values of Reference Examples 1 to 3 are defined as 100 in each table.
<Mooney Scorch> (Indicator of Scorch Resistance)

The scorch time of the rubber composition (unvulcanized) for a tire tread produced as described above was measured under conditions with a test temperature of 125° C. using an L-shaped rotor in accordance with JIS K6300-1:2001.

The results are expressed as an index when the scorch times of Reference Examples 1 to 3 are defined as 100 in each table. Larger indices indicate longer scorch times, which in turn indicates excellent scorch resistance (processability).

TABLE 1

|  | Reference Example 1 | Comparative Example 1 | Comparative Example 2 | Comparative Example 3 | Comparative Example 4 |
|---|---|---|---|---|---|
| Comparative conjugated diene rubber 1 |  | 96.3 (70) | 96.3 (70) |  |  |
| Modified conjugated diene rubber 1 | 87.5 (70) |  |  |  |  |
| Comparative conjugated diene rubber 2 |  |  |  | 96.3 (70) | 96.3 (70) |
| BR | 30 | 30 | 30 | 30 | 30 |
| Silica 1 | 80 | 80 | 80 | 80 | 80 |
| Silica 2 |  |  |  |  |  |
| Carbon black | 10 | 10 | 10 | 10 | 10 |
| Comparative silane coupling agent 1 | 8.8 (11%) | 8.8 (11%) |  | 8.8 (11%) |  |
| Silane coupling agent 2 |  |  | 8.8 (11%) |  | 8.8 (11%) |
| Silane coupling agent 1 |  |  |  |  |  |
| Comparative silane coupling agent 2 |  |  |  |  |  |
| Comparative silane coupling agent 3 |  |  |  |  |  |
| Stearic acid | 2.5 | 2.5 | 2.5 | 2.5 | 2.5 |
| Zinc oxide | 2.5 | 2.5 | 2.5 | 2.5 | 2.5 |
| Antiaging agent | 2 | 2 | 2 | 2 | 2 |
| Process oil | 18.8 | 10 | 10 | 10 | 10 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Sulfur | 1.4 | 1.4 | 1.4 | 1.4 | 1.4 |
| Evaluation items (expressed as index) |  |  |  |  |  |
| Wet performance [tanδ (0° C.)] | 100 | 98 | 99 | 101 | 102 |
| Rolling resistance [tanδ (60° C.)] | 100 | 104 | 104 | 104 | 104 |
| Mooney viscosity | 100 | 98 | 93 | 102 | 98 |
| Mooney scorch | 100 | 102 | 107 | 99 | 103 |

|  | Comparative Example 5 | Comparative Example 6 | Comparative Example 7 | Comparative Example 8 | Comparative Example 9 |
|---|---|---|---|---|---|
| Comparative conjugated diene rubber 1 |  |  |  |  |  |
| Modified conjugated diene rubber 1 | 87.5 (70) | 87.5 (70) | 87.5 (70) | 18.8 (15) | 87.5 (70) |
| Comparative conjugated diene rubber 2 |  |  |  | 75.6 (55) |  |
| BR | 30 | 30 | 30 | 30 | 30 |
| Silica 1 | 80 | 80 | 40 | 80 | 80 |
| Silica 2 |  |  |  |  |  |
| Carbon black | 10 | 10 | 50 | 10 | 10 |
| Comparative silane coupling agent 1 |  |  |  |  |  |
| Silane coupling agent 2 | 0.7 (0.9%) | 20 (25%) | 5.5 (11%) | 8.8 (11%) |  |
| Silane coupling agent 1 |  |  |  |  |  |

TABLE 1-continued

|  |  |  |  |  |  |
| --- | --- | --- | --- | --- | --- |
| Comparative silane coupling agent 2 |  |  |  |  | 8.8 (11%) |
| Comparative silane coupling agent 3 |  |  |  |  |  |
| Stearic acid | 2.5 | 2.5 | 2.5 | 2.5 | 2.5 |
| Zinc oxide | 2.5 | 2.5 | 2.5 | 2.5 | 2.5 |
| Antiaging agent | 2 | 2 | 2 | 2 | 2 |
| Process oil | 18.8 | 18.8 | 18.8 | 17.4 | 18.8 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Sulfur | 1.4 | 1.4 | 1.4 | 1.4 | 1.4 |
| Evaluation items (expressed as index) |  |  |  |  |  |
| Wet performance [tanδ (0° C.)] | 95 | 104 | 90 | 100 | 99 |
| Rolling resistance [tanδ (60° C.)] | 106 | 93 | 110 | 104 | 97 |
| Mooney viscosity | 105 | 95 | 87 | 99 | 98 |
| Mooney scorch | 116 | 97 | 120 | 104 | 102 |

|  | Comparative Example 10 | Working Example 1 | Working Example 2 | Working Example 3 | Working Example 4 | Working Example 5 | Working Example 6 |
| --- | --- | --- | --- | --- | --- | --- | --- |
| Comparative conjugated diene rubber 1 |  |  |  |  |  | 61.8 (45) |  |
| Modified conjugated diene rubber 1 | 87.5 (70) | 87.5 (70) | 87.5 (70) | 87.5 (70) | 87.5 (70) | 31.3 (25) | 87.5 (70) |
| Comparative conjugated diene rubber 2 |  |  |  |  |  |  |  |
| BR | 30 | 30 | 30 | 30 | 30 | 30 | 30 |
| Silica 1 | 80 | 80 | 80 | 80 | 80 | 80 |  |
| Silica 2 |  |  |  |  |  |  | 130 |
| Carbon black | 10 | 10 | 10 | 10 | 10 | 10 | 10 |
| Comparative silane coupling agent 1 |  |  |  |  |  |  |  |
| Silane coupling agent 2 |  | 8.8 (11%) | 12 (15%) | 3.2 (4%) |  |  | 17.0 (15%) |
| Silane coupling agent 1 |  |  |  |  | 8.8 (11%) | 8.8 (11%) |  |
| Comparative silane coupling agent 2 |  |  |  |  |  |  |  |
| Comparative silane coupling agent 3 | 8.8 (11%) |  |  |  |  |  |  |
| Stearic acid | 2.5 | 2.5 | 2.5 | 2.5 | 2.5 | 2.5 | 2.5 |
| Zinc oxide | 2.5 | 2.5 | 2.5 | 2.5 | 2.5 | 2.5 | 2.5 |
| Antiaging agent | 2 | 2 | 2 | 2 | 2 | 2 | 2 |
| Process oil | 18.8 | 18.8 | 18.8 | 18.8 | 18.8 | 13.2 | 38.8 |
| Vulcanization accelerator 1 | 1.7 | 1.7 | 1.7 | 1.7 | 1.7 | 1.7 | 1.7 |
| Vulcanization accelerator 2 | 0.4 | 0.4 | 0.4 | 0.4 | 0.4 | 0.4 |  |
| Sulfur | 1.4 | 1.4 | 1.4 | 1.4 | 1.4 | 1.4 | 1.4 |

TABLE 1-continued

| Evaluation items (expressed as index) | | | | | | | |
|---|---|---|---|---|---|---|---|
| Wet performance [tanδ (0° C.)] | 98 | 102 | 104 | 100 | 102 | 100 | 102 |
| Rolling resistance [tanδ (60° C.)] | 99 | 97 | 94 | 100 | 98 | 99 | 100 |
| Mooney viscosity | 99 | 88 | 84 | 92 | 85 | 93 | 95 |
| Mooney scorch | 101 | 110 | 108 | 115 | 115 | 112 | 105 |

TABLE 2

| | Reference Example 2 | Working Example 7 | Working Example 8 | Working Example 9 | Working Example 10 |
|---|---|---|---|---|---|
| Comparative conjugated diene rubber 1 | | | | | 61.8 (45) |
| Modified conjugated diene rubber 1 | 87.5 (70) | 87.5 (70) | 87.5 (70) | 87.5 (70) | 31.3 (25) |
| Comparative conjugated diene rubber 2 | | | | | |
| BR | 30 | 30 | 30 | 30 | 30 |
| Silica 1 | 80 | 80 | 80 | 80 | 80 |
| Carbon black | 10 | 10 | 10 | 10 | 10 |
| Comparative silane coupling agent 1 | 8.8 (11%) | | | | |
| Silane coupling agent 2 | | 8.8 (11%) | 12 (15%) | | |
| Silane coupling agent 1 | | | | 8.8 (11%) | 8.8 (11%) |
| Terpene resin 1 | 10 | 10 | 10 | 10 | 10 |
| Stearic acid | 2.5 | 2.5 | 2.5 | 2.5 | 2.5 |
| Zinc oxide | 2.5 | 2.5 | 2.5 | 2.5 | 2.5 |
| Antiaging agent | 2 | 2 | 2 | 2 | 2 |
| Process oil | 18.8 | 18.8 | 18.8 | 18.8 | 13.2 |
| Vulcanization accelerator 1 | 1.7 | 1.7 | 1.7 | 1.7 | 1.7 |
| Vulcanization accelerator 2 | 0.4 | 0.4 | 0.4 | 0.4 | 0.4 |
| Sulfur | 1.4 | 1.4 | 1.4 | 1.4 | 1.4 |
| Evaluation items (expressed as index) | | | | | |
| Wet performance [tanδ (0° C.)] | 100 | 102 | 104 | 102 | 100 |
| Rolling resistance [tanδ (60° C.)] | 100 | 97 | 94 | 98 | 99 |
| Mooney viscosity | 100 | 88 | 84 | 85 | 93 |
| Mooney scorch | 100 | 110 | 108 | 115 | 112 |

TABLE 3

| | Reference Example 3 | Working Example 11 | Working Example 12 |
|---|---|---|---|
| Conjugated diene rubber 2 | 70 | 70 | 70 |
| Comparative conjugated diene rubber 1 | | | |
| Butadiene rubber | 30 | 30 | 30 |
| Silica 1 | 80 | 80 | 80 |
| Carbon black | 10 | 10 | 10 |
| Comparative silane coupling agent 1 | 8.8 | | |
| Silane coupling agent 2 | | 8.8 | |
| Silane coupling agent 1 | | | 8.8 |
| Stearic acid | 2.5 | 2.5 | 2.5 |
| Zinc oxide | 2.5 | 2.5 | 2.5 |
| Antiaging agent | 2 | 2 | 2 |
| Process oil | 20 | 20 | 20 |
| Vulcanization accelerator 1 | 1.7 | 1.7 | 1.7 |
| Vulcanization accelerator 2 | 0.4 | 0.4 | 0.4 |
| Sulfur | 1.4 | 1.4 | 1.4 |
| Silane coupling agent/silica | | 11% | 11% |
| 0° C. tanδ | 100 | 104 | 104 |
| 60° C. tanδ | 100 | 95 | 96 |
| Mooney viscosity | 100 | 88 | 85 |
| Mooney scorch | 100 | 110 | 115 |

The details of each of the components shown in each table are as follows.

Comparative conjugated diene rubber 1: E581 (manufactured by the Asahi Kasei Corporation), oil-extended product (contains 37.5 parts by mass of extender oil per 100 parts by mass of SBR; the net SBR content in the SBR is 72.7 mass %), styrene content: 37 mass %, vinyl bond content: 43%, weight average molecular weight: 1,200,000. Styrene butadiene rubber having a hydroxy group at the terminal and not having an isoprene block. The modified part does not have a polyorganosilxane.

Modified conjugated diene rubber 1: modified conjugated diene rubber 1 produced as described above Comparative conjugated diene rubber 2: SLR6430 (Produced by the Dow Chemical Corporation), oil-extended product (contains 37.5 parts by mass of extender oil per 100 parts by mass of SBR; the net SBR content in the SBR is 72.7 mass %), styrene content: 41 mass %, vinyl bond content: 25%, weight average molecular weight: 1,010,000. Unmodified styrene butadiene rubber and not having an isoprene block.

Modified conjugated diene rubber 2: modified conjugated diene rubber 2 produced as described above BR: butadiene rubber, Nipol1220 (manufactured by the Zeon Corporation)

Silica 1: Zeosil 1165 MP (CTAB adsorption specific surface area=165 m$^2$/g, manufactured by the Rhodia Corporation)

Silica 2: Zeosil 115 MP (CTAB adsorption specific surface area=110 m$^2$/g, manufactured by the Rhodia Corporation)

Carbon black: Show Black N339 (CTAB adsorption specific surface area=90 m$^2$/g, manufactured by Cabot Japan)

Comparative silane coupling agent 1: VP Si363 (manufactured by Evonik Degussa) (compound represented by the following formula (11). Here, $R^{111}$: —$C_2H_5$, $R^{112}$: —$O(C_2H_4O)_5$—$C_{13}H_{27}$, $R^{114}$: —$(CH_2)_3$—, l=1, m=2, and n=0)

[Formula 11]

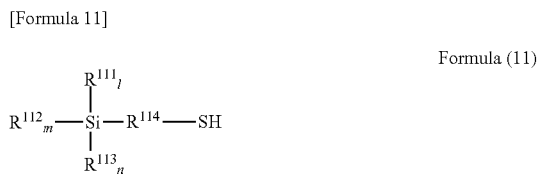

Formula (11)

Silane coupling agent 1: polysiloxane 1 synthesized as described above

Silane coupling agent 2: polysiloxane 2 synthesized as described above

Comparative silane coupling agent 2: comparative polysiloxane 1 synthesized as described above Comparative silane coupling agent 3: comparative polysiloxane 2 synthesized as described above Terpene resin 1: YS Resin TO125 (manufactured by Yasuhara Chemical Co., Ltd.) (aromatic modified terpene resin, softening point: 125° C.)

Stearic acid: stearic acid YR (manufactured by the NOF Corporation)

Zinc oxide: Type 3 zinc flower (manufactured by Seido Chemical Industry Ltd.)

Antiaging agent: Santoflex 6PPD (manufactured by the Solutia Europe Corporation)

Process oil: Extract No. 4 S (manufactured by Showa Shell Seikyu K.K.)

Vulcanization accelerator 1: N-cyclohexyl-2-benzothiazolyl sulfenamide, NOCCELER CZ-G (manufactured by Ouchi Shinko Chemical Industrial Co., Ltd.)

Vulcanization accelerator 2: Perkacit DPG (manufactured by the Flexsys Corporation)

Sulfur: oil-processed sulfur (manufactured by Karuizawa Refinery, Inc.)

As is clear from the results shown in Table 1, Comparative Example 1, which contains a conjugated diene rubber not having an isoprene block and contains a silane coupling agent other than the polysiloxane represented by the average composition formula of formula (1), demonstrated poor wet performance and low rolling resistance in comparison to Reference Example 1. Comparative Example 2, which contains the same conjugated diene rubber as in Comparative Example 1 and in which the silane coupling agent is replaced with the polysiloxane represented by the average composition formula of formula (1), demonstrated a low Mooney viscosity, high Mooney scorch and excellent processability in comparison to Comparative Example 1, but the wet performance and low rolling resistance were inferior to those of Reference Example 1.

Comparative Example 3, which contains an unmodified conjugated diene rubber not having an isoprene block and contains a silane coupling agent other than the polysiloxane represented by the average composition formula of formula (1), demonstrated poor low rolling resistance and processability in comparison to Reference Example 1. Comparative Example 4, which contains the same conjugated diene rubber as in Comparative Example 3 and in which the silane coupling agent is replaced with the polysiloxane represented by the average composition formula of formula (1), demonstrated a low Mooney viscosity, high Mooney scorch and excellent processability in comparison to Comparative Example 3, but the low rolling resistance was inferior to that of Reference Example 1.

Comparative Example 5, in which the content of the silane coupling agent represented by the average composition formula of formula (1) is less than 1 mass % of the silica content, demonstrated wet performance and low rolling resistance inferior to those of Reference Example 1, and the processability was poor with a high Mooney viscosity.

Comparative Example 6, in which the content of the silane coupling agent represented by the average composition formula of formula (1) exceeds 20 mass % of the silica content, demonstrated a low Mooney scorch and poor processability in comparison to Reference Example 1.

Comparative Example 7, in which the amount of silica in 100 parts by mass of the diene rubber component is less than 60 parts by mass, demonstrated wet performance and low rolling resistance inferior to those of Reference Example 1.

Comparative Example 8, in which the amount of the modified conjugated diene rubber in the diene rubber component is less than 20 mass %, demonstrated low rolling resistance inferior to that of Reference Example 1.

In addition, Comparative Examples 9 and 10, which do not contain the silane coupling agent represented by the average composition formula of formula (1) and contain a polysiloxane other than the specific polysiloxane, demonstrated wet performance inferior to that of Reference Example 1.

In contrast, Working Examples 1 to 6 demonstrated excellent wet performance and low rolling resistance as well as excellent processability due to a low Mooney viscosity and high Mooney scorch. In addition, Working Examples 1 to 6 demonstrated wet performance and low rolling resistance equivalent or superior to that of Reference Example 1 as well as processability superior to that of Reference Example 1 due to a lower Mooney viscosity and higher Mooney scorch.

Furthermore, the differences in the effects on each of the evaluation results due to the use of a modified conjugated diene rubber and the replacement of the silane coupling agent with the polysiloxane represented by the average composition formula of formula (1) from the comparative silane coupling agent 1 (differences between Reference Example 1 and Working Example 1) were substantially greater than the differences in the effects on each of the evaluation results due to the use of a conjugated diene rubber other than a modified conjugated diene rubber and the replacement of the silane coupling agent with the polysiloxane represented by the average composition formula of formula (1) from the comparative silane coupling agent (the differences between Comparative Examples 1 and 2 or the differences between Comparative Examples 3 and 4). Specifically, the effects on Mooney viscosity and Mooney scorch are substantial, and the tire performance such as the wet performance or low rolling resistance also improved.

It can be inferred from this result that the combination of a modified conjugated diene rubber and a polysiloxane represented by the average composition formula of formula (1) is particularly effective for improving wet performance, low rolling resistance, and processability.

In addition, in a comparison of Working Examples 1 and 4, it can be seen that the processability (unvulcanized characteristic) of Working Example 4 is even better than that of Working Example 1.

As is clear from the results shown in Table 2, Working Examples 7 to 10 demonstrate wet performance equivalent to or superior to that of Reference Example 2, low rolling resistance superior to that of Reference Example 2 as well as superior processability due to a lower Mooney viscosity and higher Mooney scorch.

As is clear from the results shown in Table 3, Working Examples 11 and 12 demonstrate wet performance and low rolling resistance superior to those of Reference Example 3 as well as superior processability due to a lower Mooney viscosity and higher Mooney scorch.

What is claimed is:

1. A rubber composition for a tire tread containing a diene rubber component containing at least 20 mass % of a modified conjugated diene rubber, a silica, and a silane coupling agent;
   the modified conjugated diene rubber having at least one modified part and at least one conjugated diene rubber part;
   the conjugated diene rubber part having a conjugated diene copolymer block and an isoprene block containing from 70 mass % to 100 mass % of isoprene units in each conjugated diene rubber part;
   the modified part bonding to an end of the conjugated diene rubber part;
   the modified part having a functional group which interacts with the silica;
   the silane coupling agent being a polysiloxane represented by the following formula (1):

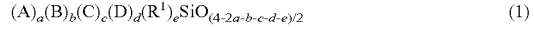

wherein formula (1) is an average composition formula, and in formula (1), A is a divalent organic group containing a sulfide group; B is a monovalent hydrocarbon group having from 5 to 10 carbon atoms; C is a hydrolysable group; D is an organic group containing a mercapto group $R^1$ is a monovalent hydrocarbon group having from 1 to 4 carbon atoms; and a to e satify the relational expressions $0<a<1$, $0\leq b<1$, $0<c<3$, $0<d<1$, $0\leq e<2$, and $0<2a+b+c+d+e<4$;
   a content of the silica being from 60 to 200 parts by mass per 100 parts by mass of the diene rubber component; and
   a content of the silane coupling agent being from 1.0 to 20 mass % of the content of the silica.

2. The rubber composition for a tire tread according to claim 1, wherein b is greater than 0 in formula (1).

3. The rubber composition for a tire tread according to claim 1, wherein the skeleton of the modified part is a polyorganosiloxane.

4. The rubber composition for a tire tread according to claim 1, wherein a weight average molecular weight of the polysiloxane represented by formula (1) is from 500 to 2,300.

5. The rubber composition for a tire tread according to claim 1, further comprising a terpene resin, wherein an amount of the terpene resin is from 1 to 30 parts by mass per 100 parts by mass of the diene rubber component, and the terpene resin is an aromatic modified terpene resin having a softening point of from 60 to 150° C.

6. The rubber composition for a tire tread according to claim 1, wherein a vinyl bond content derived from the isoprene units in the isoprene block is from 5 to 85 mass %.

7. The rubber composition for a tire tread according to claim 1, wherein the conjugated diene copolymer block is obtained using a conjugated diene monomer (d1) and an aromatic vinyl monomer;
   an aromatic vinyl unit content derived from the aromatic vinyl monomer is from 38 to 48 mass % of the conjugated diene rubber; and
   a vinyl bond content of the conjugated diene rubber part is from 20 to 35 mol % of the conjugated diene units constituting the conjugated diene rubber part.

8. The rubber composition for a tire tread according to claim 1, wherein a weight average molecular weight of the modified conjugated diene rubber is from 1,000 to 3,000,000.

9. The rubber composition for a tire tread according to claim 1, wherein the conjugated diene rubber part has a conjugated diene copolymer block on an end other than the end; and
 the modified conjugated diene rubber has the isoprene block between the conjugated diene copolymer block and the modified part.

10. The rubber composition for a tire tread according to claim 9, wherein a weight average molecular weight of the modified conjugated diene rubber is from 600,000 to 1,000,000.

11. The rubber composition for a tire tread according to claim 1, wherein the conjugated diene rubber part has the isoprene block on an end other than the end; and
 the modified conjugated diene rubber has the isoprene block between the conjugated diene copolymer block and the modified part.

12. The rubber composition for a tire tread according to claim 1, wherein the functional group is at least one selected from the group consisting of an epoxy group and a hydrocarbyloxysilyl group.

13. A pneumatic tire having tire treads formed using the rubber composition for a tire tread described in claim 1.

* * * * *